US012654379B2

(12) United States Patent
Hess et al.

(10) Patent No.: US 12,654,379 B2
(45) Date of Patent: Jun. 16, 2026

(54) METHOD AND DEVICE FOR CHECKING PIPETTE TIPS

(71) Applicant: Roche Diagnostics International AG, Rotkreuz (CH)

(72) Inventors: Peter Hess, Aristau (CH); Samuel Albin, Siat (CH); Placi Wenzin, Walenstadt (CH); Fabian Caduff, Chur (CH)

(73) Assignee: Roche Diagnostics International AG, Rotkreuz (CH)

( * ) Notice: Subject to any disclaimer, the term of this patent is extended or adjusted under 35 U.S.C. 154(b) by 221 days.

(21) Appl. No.: 18/551,633

(22) PCT Filed: Mar. 22, 2022

(86) PCT No.: PCT/EP2022/057534
§ 371 (c)(1),
(2) Date: Sep. 21, 2023

(87) PCT Pub. No.: WO2022/200375
PCT Pub. Date: Sep. 29, 2022

(65) Prior Publication Data
US 2024/0173906 A1 May 30, 2024

(30) Foreign Application Priority Data
Mar. 22, 2021 (EP) ..................................... 21164105

(51) Int. Cl.
*B29C 45/76* (2006.01)
*B01L 9/00* (2006.01)
(Continued)

(52) U.S. Cl.
CPC .......... *B29C 45/7686* (2013.01); *B01L 9/543* (2013.01); *B01L 9/56* (2019.08);
(Continued)

(58) Field of Classification Search
CPC .............. G01B 11/245; G01B 11/2433; B29C 45/7686; B29C 2945/76464; B29C 2945/76103; B29C 2945/76421
See application file for complete search history.

(56) References Cited

U.S. PATENT DOCUMENTS

| | | | |
|---|---|---|---|
| 2021/0261278 A1 | 8/2021 | Kammerloher | |
| 2021/0339446 A1 | 11/2021 | Kammerloher | |
| 2024/0142388 A1* | 5/2024 | Ergert .................. | G01N 21/909 |

FOREIGN PATENT DOCUMENTS

| | | |
|---|---|---|
| DE | 10 2017 012 225 A1 | 5/2019 |
| DE | 10 2018 120 963 A1 | 3/2020 |

(Continued)

OTHER PUBLICATIONS

European Search Report Corresponding to 21164105.5 mailed Sep. 30, 2021.

(Continued)

*Primary Examiner* — John J DeRusso
(74) *Attorney, Agent, or Firm* — Secant IP, PLLC

(57) ABSTRACT

A method and apparatus for inspecting pipette tips for defects. A holding device picks up multiple pipette tips from a first carrier. A first image acquisition device, with its optical axis aligned with the longitudinal axes of the tips, captures first image data of the pipette tip outlet openings. A second image acquisition device, with its optical axis transverse to the longitudinal axes, simultaneously captures second image data of the side surfaces of the multiple tips. A data processing system determines if the image data is within predefined limits. Pipette tips with data outside the limits are discarded, while tips with data within the limits are dispensed into a second carrier. The pipette tips may be rotated about their longitudinal axes during the acquisition of the second image data to check for concentricity.

20 Claims, 16 Drawing Sheets

Figures 1, 2A:
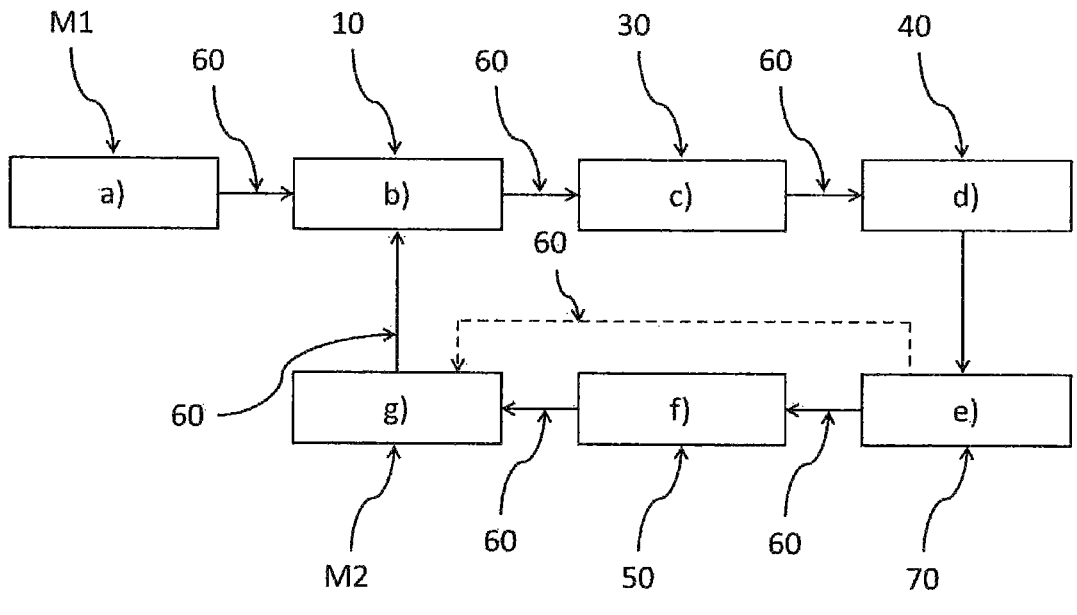

(51) Int. Cl.
    B29L 31/00        (2006.01)
    G01B 11/24        (2006.01)

(52) U.S. Cl.
    CPC ..... *G01B 11/2433* (2013.01); *B01L 2200/143*
        (2013.01); *B29C 2945/76103* (2013.01); *B29C*
            *2945/76421* (2013.01); *B29C 2945/76464*
                (2013.01); *B29L 2031/753* (2013.01)

(56)               References Cited

FOREIGN PATENT DOCUMENTS

| EP | 2 913 107 A1 | 9/2015 |
| EP | 3 967 472 A1 | 3/2022 |
| WO | 00/52987 A1 | 9/2000 |
| WO | 2020/079170 A1 | 4/2020 |

OTHER PUBLICATIONS

International Search Report Corresponding to PCT/EP2022/057534 mailed Jul. 26, 2022.
Written Opinion Corresponding to PCT/EP2022/057534 mailed Jul. 26, 2022.

* cited by examiner

M1

B - B

METHOD AND DEVICE FOR CHECKING PIPETTE TIPS

The present invention relates to a method and an apparatus for inspecting pipette tips and to an injection molding machine comprising at least one apparatus for inspecting pipette tips as described below.

Pipette tips are usually manufactured by injection molding, whereby the injection molding machines used usually have a plurality of cavities arranged in a circle, each of which is bounded by an injection mold. In practice, the problem is that an inner part of the mold is radially displaced from an original optimum position over time due to the pressure conditions that occur during the injection process, so that the wall thickness of the manufactured pipette tips changes slightly over time. This in turn causes the different wall sections of the injected pipette tips to cool at different rates, resulting in minimal distortion (curvature of the longitudinal axis) of the pipette tips, whereby the pipette tip outlet opening of pipette tips manufactured at a later time deviate further from a centric optimum position than pipette tips manufactured after a mold change. If this deviation exceeds a certain level, the pipette tips can no longer be used, as they are no longer suitable for accurately measuring the liquid to be dispensed and/or can no longer be precisely controlled by an automated analysis apparatus or other handling devices.

As a quality assurance measure in pipette tip production, it is known from the prior art, for example from WO 00/52987 A1, to transport individual pipette tips by means of a gripper to a camera which acquires image data from different angles of rotation about a longitudinal axis of the pipette tip. This image data is subsequently analyzed with respect to compliance with specified tolerances. However, it has been found that the analysis of the laterally recorded image data is problematic with regard to reliable defect detection, in particular because even straight, i.e. non-warped, pipette tips are detected as defective if they are not held optimally straight in the gripper. In addition, it is disadvantageous that the isolated feeding of pipette tips to a single camera means that the quality assurance measure is very time-consuming.

A method for assessing pipette tip distortion is known from EP 2913107 A1, in which the distortion is detected by means of image data. In this method, first and second image data of the pipette tip ends and pipette tip inlet openings are acquired with respect to a pipette tip group with a plurality of pipette tips, the viewing directions of the first and second image acquisition device being opposite to each other, and an average value of the deviation of the pipette tip outlet openings is then determined. On the one hand, this method is very complex in terms of equipment, since separate first and second image acquisition devices are required. Furthermore, the determination of the target position of the pipette tip outlet openings by means of the second image acquisition device aligned with the inlet opening of the upper pipette tip end has proven in practice to be difficult or error-prone in some cases. For example, the tolerances of determining the desired position of the pipette tip using the second image acquisition device and the tolerances of determining the actual position using the first image acquisition device overlap with each other, which can lead to inaccuracies in determining the actual deviation of the pipette tip distortion. Also, with this method, for example, a correctly shaped pipette tip, which is in a skewed position in its holder, is not detected and rejected as a defect simply because, due to the misalignment of the pipette tip in the holder, the deviation of the pointed end of the pipette tip from the specified axial direction is evaluated as a defect.

In order to reduce these inaccuracies in the holding of pipette tips, DE 10 2017 012 225 A1 proposes a pressing-on device which, by exerting mechanical force on the pipette tip held in a holder, effects a particularly well-defined position of the pipette tip in the holder. The pipette tip, which is arranged with a defined fit on the holder, can thus be subjected to the measurement reliably and with low error tolerance, the image acquisition device provided for this purpose detecting the position of the free end of the pipette tip. The distortion of the pipette tip is determined as the positional deviation of a predetermined area of the pipette tip held in the holder from a predefined nominal position of this area in the case of a distortion-free pipette tip. A disadvantage of this method is, on the one hand, that it is very complex in terms of equipment due to the large number of separate devices of the testing device. Furthermore, for simultaneous inspection of a plurality of pipette tips, a kind of revolving mechanism for feeding a single pipette tip at a time to the pressing device or the use of several image acquisition devices corresponding to the number of pipette tips held on the holder is proposed, which further increases the apparatus-related complexity and cost of such an inspection device.

WO 2020/079170 A1 discloses a method and a device for checking pipette tips, wherein a reference region of a held pipette tip extending in the axial direction is detected by a first detection means and the axis of symmetry of the pipette tip is calculated on the basis of the reference region. To detect a curvature or skew of the injection molded part, the position of a symmetry axis section spaced in the axial direction from the reference region is detected by a second detection means and compared with the previously calculated symmetry axis. However, due to the isolated feeding of pipette tips to the device, the inspection of the pipette tips remains very time-consuming.

Based on the aforementioned prior art, the present invention is based on the object of eliminating such and further disadvantages of the prior art and, in particular, of providing an advantageous method of inspecting the openings and the distortion of elongated injection molded parts such as, in particular, pipette tips, which can be carried out quickly, reliably and with little effort in terms of the testing apparatus required for this purpose. Furthermore, the present invention is based on the object of providing a testing apparatus suitable for carrying out the method.

The object is solved by a method of inspecting pipette tips, an apparatus for inspecting pipette tips, which apparatus is preferably adapted to carry out the method according to the invention, and an injection molding machine comprising a device according to the invention for inspecting pipette tips according to the independent patent claims. Further, advantageous embodiments are the subject of the dependent patent claims. Unless reference is made in the following description of advantageous embodiments to a specific embodiment of the method according to the invention or to a specific embodiment of the apparatus according to the invention, such advantageous embodiments refer in principle to all of the embodiments of the method according to the invention or of the apparatus according to the invention described herein.

In particular, the object is solved by a method of inspecting pipette tips each extending along a longitudinal axis (L), the method according to the invention comprising the following steps: a) providing pipette tips arranged in a first carrier; b) picking up pipette tips from the first carrier by a holding device comprising a plurality of pick-up elements for receiving one pipette tip each; c) acquiring first image data of the respective pipette tip outlet openings of the pipette tips picked up by the holding device by a first image acquisition device; d) acquiring second image data of the pipette tips held in the holding device by a second image acquisition device. During acquisition of the second image data, the optical axis of the second image acquisition device is aligned transversely to the respective longitudinal axis of the pipette tips held in the holding device and onto the partial segments, facing the second image acquisition device, of the respective pipette tip jacket surfaces of the held pipette tips. In this case, the second image data of a plurality of the pipette tips held in the holding device are acquired simultaneously. Preferably, the second image data of all of the pipette tips held in the holding device are acquired simultaneously; e) determining whether or not the first and/or second image data are within predefined allowable limits. This is done with the aid of a data processing system; f) discarding those pipette tips whose first and/or second image data determined in step e) lie outside the predefined allowable limits into a waste container by the holding device; g) dispensing those pipette tips whose first and second image data determined in step e) lie within the predefined allowable limits into a second carrier. The second carrier may in particular be a rack.

In a first embodiment, the method according to the invention comprises the following steps: a) providing pipette tips arranged in a first carrier in a first matrix arrangement of rows and columns in the first carrier; b) picking up a row or column of pipette tips from the first matrix arrangement by a holding device comprising a plurality of pick-up elements arranged in a row for receiving one pipette tip each. The longitudinal axes of the pipette tips held by the pick-up elements lie substantially in a common plane; c) acquiring first image data of the respective pipette tip outlet openings of the pipette tips picked up by the holding device by a first image acquisition device. During the acquisition of the first image data, the optical axis of the first image acquisition device is aligned with the respective longitudinal axis of the pipette tips held in the holding device, in particular parallel, and aligned onto the pipette tip outlet openings; d) acquisition of second image data of the pipette tips held in the holding device by a second image acquisition device. During the acquisition of the second image data, the optical axis of the second image acquisition device is thereby aligned substantially perpendicular to the plane defined by the held pipette tips and onto the partial segments of the respective pipette tip jacket surfaces of the held pipette tips facing the second image acquisition device, so that all pipette tips held in the holding device are arranged substantially in one image plane of the second image acquisition device. The second image data of all pipette tips held in the holding device are thereby acquired simultaneously; e) determining whether or not the first and/or second image data lie within predefined allowable limits with the aid of a data processing system; f) discarding those pipette tips whose first and/or second image data determined in step e) lie outside the predefined allowable limits into a waste container by the holding device; g) dispensing those pipette tips whose first and second image data determined in step e) are within the predefined allowable limits into a second carrier having a plurality of holes in a second matrix arrangement of rows and columns, the holes of which are suitable for holding the dispensed pipette tips. In method step g), the pipette tips are dispensed by the holding device such that the respective rows or columns of holes of the second carrier are successively filled without leaving one or more empty holes between two dispensed pipette tips.

The method according to the invention allows efficient assessment of all pipette tips to determine deviations of the pipette tips from a predefined standard by means of two image acquisition devices. For example, a deviation of the pipette tips from a standard is a distortion of the injection molded part or a deviation of the pipette tips from a desired shape. A deviation of the pipette tips from a standard is measured as a positional deviation of the pipette tip opening or of a predetermined area of the pipette tip jacket surface from respective predefined nominal positions of these areas. The theoretical centerline is recorded for each acquired image. A systematic error due to obliquely clamped test specimens, i.e. pipette tips, can thus be filtered out. In other words, the distortion of a pipette tip to be tested is measured by comparison with a previously measured, non-distorted pipette tip. A standard deviation of the pipette tip is also understood to be the deviation of its surface quality from a predetermined nominal value. The surface quality is characterized in particular by the presence or absence of scratches, cloudy areas, perforations or other damages. By arranging the held pipette tips in a single image plane of the second image acquisition device, the acquisition of the second image data can be particularly precise. Rotating the pipette tips on their respective pick-up elements allows the geometry of the pipette tips to be detected more precisely.

In the context of the present invention, the term matrix arrangement is understood to mean a, preferably regular, arrangement of holes configured to hold a pipette tip in each case, the holes being arranged in rows and columns. Each row comprises a number of n holes and each column comprises a number of m holes, so that the number of holes contained in the matrix arrangement results from the product of n and m. Such matrix arrangements are present, for example, in the containers for pipette tips known from the prior art, so-called racks.

In the context of the present invention, the term image acquisition device is understood to mean a camera, in particular a camera with a lens and suitable illumination. Telecentric lenses are particularly suitable as lenses, since these greatly reduce negative edge effects of round objects, such as elongated injection molded parts with an axis of symmetry, especially such as pipette tips.

It has been found that the distortion of pipette tips continues for some time after the actual manufacturing process in an injection molding machine, which is why it is advantageous for quality assurance to first allow the pipette tips produced to cool down completely and assume a final shape for a certain period of time, in particular for a period of two days. In order not to have to keep expensive and less available workpiece carriers of the injection molding machine on hand during this time for the purpose of temporarily storing the pipette tips to be tested, the pipette tips to be tested can be temporarily stored in racks.

In an advantageous further embodiment of the first embodiment of the method according to the invention, the first carrier providing pipette tips in a first matrix arrangement of rows and columns is a rack. Similarly, the second carrier is a rack comprising a plurality of holes arranged in a second matrix arrangement of rows and columns.

According to the invention, it is conceivable that the pipette tips to be tested are picked up from the first carrier by the holding device in step b) and the tested pipette tips are delivered back to the first carrier in step g), whereby pipette tips from a reservoir of tested pipette tips are used to replace the pipette tips that may have been discarded in step f) and to replenish the first carrier.

According to the invention, it is also conceivable that the pipette tips to be tested are picked up from the first carrier by the holding device in step b) and that initially only the first image data of the pipette tips picked up by the holding device are acquired in step c) before the pipette tips tested in step c) are returned to the first carrier in a process step g'). In particular, it is also conceivable in this context that the pipette tips to be tested have not yet cooled down completely when the first image data are acquired by the first image acquisition device in step c). Surprisingly, it has been found that core fractures can already be reliably detected on pipette tips that have not yet cooled down completely by acquiring the first image data. This means that core fractures can be detected and repaired much earlier in the injection molding machine.

Following step g'), the pipette tips that have already been partially tested are again picked up from the first carrier by the holding device in step b), whereupon the pipette tips are run through process steps c) to g) or d) to g) for complete testing.

In a preferred further embodiment of the first embodiment of the method according to the invention, the holding device removes a complete row or a complete column of pipette tips from the first matrix arrangement in step b). Preferably, the holding device removes all pipette tips of a row or a column of a rack in step b).

This optimizes the efficiency of the method according to the invention, since the pipette tips held by the pick-up elements of the holding device are each tested together in the subsequent method steps c) and d), as will be explained in more detail below.

In a preferred further embodiment of the first embodiment of the method according to the invention, the number of pick-up elements of the holding device matches the number of pipette tips provided in a row or column of the first matrix arrangement and/or the second matrix arrangement of holes in the second carrier. In other words, the holding device is matched to the first and/or second carriers used in the method according to the invention, which makes it possible to carry out the method according to the invention in a particularly cost-efficient manner.

Surprisingly, it has been found that the second image data can also be reliably and satisfactorily acquired when the longitudinal axes (L) of the pipette tips held by the pick-up elements in the holding device do not lie substantially in a common plane.

In a second embodiment of the method according to the invention, the pipette tips provided in step a) are arranged in the first carrier in at least one circular array. Preferably, the pipette tips provided in step a) are arranged in at least one circular array of eight pipette tips evenly spaced from each other in the circumferential direction of the circular array. In this embodiment, the holding device in step b) picks up a circular array, in particular a full circular array, of pipette tips from the first carrier. Optionally, prior to the acquisition of the second image data in step d), the holding device is rotated about its axis of rotation by an angle of rotation ß in such a way that the contours of at least some of the pipette tips held in the holding device can be detected by the second image acquisition device. Preferably, the rotation of the holding device about its axis of rotation causes the contours of all pipette tips held in the holding device to be detectable by the second image acquisition device.

This second embodiment has the additional advantages that by picking up pipette tips in a circular array, it is possible to dispense with an automation system upstream of the apparatus according to the invention, which converts the circular array, as is usually present in the mold of an injection molding machine, into a linear arrangement. Testing of the pipette tips can thus be carried out while maintaining the mold arrangement of the injection molding machine, without prior reorientation of the pipette tips. As a result, the constructional and financial effort as well as the space requirement of the apparatus according to the invention can be significantly reduced.

In the context of the present invention, the "axis of rotation of the holding device" is understood to mean the axis of rotation extending in the direction of the pipette tips picked up by the holding device.

In the context of the present invention, the term "detectable contours" means in particular the contours extending along the longitudinal direction of the pipette tip, so that the respective image acquisition device can distinguish pipette tips which are held in the holding device and are located in the optical axis of the respective image acquisition device from one another. In other words, pipette tips whose contours are detectable are not so partially or even completely obscured or overlapped by one or more other pipette tips in the optical axis of the respective image acquisition device that they would be indistinguishable. Preferably, the contours are completely detectable, i.e. over essentially the entire length of the respective pipette tips.

In an advantageous further development of the second embodiment of the method according to the invention, the holding device is rotated about its axis of rotation during the acquisition of the second image data in step d). The holding device thereby preferably performs at least three quarters of a rotation about its axis of rotation, i.e. a rotation of at least 270°, during the acquisition of the second image data. The rotation of the holding device about its axis of rotation makes it possible to record the second image data particularly simply and efficiently, since in this case there is no need for further drive means for rotating the individual pick-up elements, which significantly reduces the complexity and maintenance requirements of the holding device.

In an advantageous further development of the second embodiment of the method according to the invention, in which the holding device is rotated about its axis of rotation during the acquisition of the second image data in step d), the optical axis of the second image acquisition device is further aligned with an illumination device attached to the holding device and arranged in the center of the circular array of pipette tips during the acquisition of the second image data in step d). The illumination device is configured to emit light in the direction of the second image acquisition device during the acquisition of the second image data in step d).

In an advantageous further development of the second embodiment of the method according to the invention, the second image data of the pipette tips held in the holding device are additionally acquired by a third image acquisition device in step d). During the acquisition of the second image data, the optical axis of the third image acquisition device is aligned essentially perpendicular to the optical axis of the second image acquisition device and onto the partial segments of the respective pipette tip jacket surfaces of the held pipette tips facing the third image acquisition device.

In this context, it may be necessary or advantageous—depending on the arrangement of the pipette tips held in the holding device in the beam path of the second and third image acquisition device—to rotate the holding device about its axis of rotation by an angle of rotation β before acquiring the second image data in step d), that the contours of a first part of the pipette tips held in the holding device can be detected, preferably completely, by the second image detection device, and that the contours of a second part of the pipette tips held in the holding device can be detected, preferably completely, by the third image detection device.

The provision of a further image acquisition device, i.e. the third image acquisition device, for acquiring the second image data makes it possible to reliably inspect even in the presence of pipette tips that are close to one another in the direction of rotation of the circular array, where a single image acquisition device, i.e. the second image acquisition device, would no longer be able to detect a gap between the pipette tips imaged adjacent to one another in the beam path, in particular in the region of the respective pick-up elements, on the left and right with respect to the longitudinal axis of the respective pipette tips.

In an advantageous further development of the second embodiment of the method according to the invention, an illumination device is attached to the holding device, which divides the circular array of pipette tips on the holding device into two halves. The illumination device has two plane-parallel light emitting surfaces for emitting light in the direction of the second image acquisition device and opposite to this direction. The optical axis of the second image acquisition device is aligned perpendicular to the illumination device attached to the holding device during the acquisition of the second image data in step d). The second image data of one half of the pipette tips is acquired first, and the holding device is subsequently rotated 180° about its axis of rotation before the second image data of the other half of the pipette tips is acquired. Alternatively a further image acquisition device can be provided for acquiring second image data of the pipette tips held in the holding device. The optical axis of this further image acquisition device is aligned in the opposite direction to the optical axis of the second image acquisition device. Thus, the second image data of both halves of the circular array of pipette tips are acquired simultaneously.

In order to be able to acquire the image data quickly and efficiently, the position of the pipette tips is detected with a measuring device and the first image acquisition device is triggered in this way.

In a preferred embodiment of the method according to the invention, the first image data are acquired in step c) when the pipette tips held in the holding device are moved transversely to the optical axis of the first image acquisition device and through the optical axis of the first image acquisition device relative to each other. The entry of the respective pipette tips, in particular the respective pipette tip outlet openings, into the optical axis of the first image acquisition device is thereby detected by a measuring device and triggers the acquisition of the first image data by the first image acquisition device. The measuring device for detecting the entry of the respective pipette tips into the optical axis of the first image acquisition device is, for example, a light barrier. The light barrier is directed, for example, transversely to the longitudinal axis of the pipette tips and onto the respective pipette tip outlet opening through the pipette tip outlet opening, so that the acquisition of the first image data by the first image acquisition device is triggered when the light barrier is interrupted. In accordance with the invention, it is of course also conceivable that the measuring device for detecting the entry of the respective pipette tips into the optical axis of the first image acquisition device does not run through the optical axis of the first image acquisition device, but is arranged upstream of the first image acquisition device in the direction of movement of the holding device. In this case, the triggering of the acquisition of the first image data can be calculated or adjusted by the distance between the measuring device and the optical axis of the first image acquisition device and the speed of movement of the holding device and the first image acquisition device relative to each other.

In particular, only the holding device is moved and the first image acquisition device remains stationary so that the respective pipette tip outlets of the pipette tips held in the holding device are moved past the first image acquisition device substantially in a single image plane of the first image acquisition device.

As a result, all pipette tips held in the holding device, in particular the respective pipette tip outlet openings, can be inspected in one method step, which increases the speed of the inspection. The passing of the pipette tip outlet openings in essentially a single image plane of the first image acquisition device also increases the accuracy of the image acquisition.

In a preferred embodiment of the method according to the invention, step d) comprises the following method steps: i. Acquiring a first image of the pipette tips held in the holding device. The pipette tips are each in a first position; ii. Rotating the pipette tips held in the holding device about their longitudinal axis by a predetermined angle of rotation α to a second position; iii. Acquiring a second image of the pipette tips held in the holding device. The pipette tips are each in the second position; the angle of rotation α between the first position and the second position of the pipette tips is at least substantially 90°. Preferably, the angle of rotation α between the first position and the second position of the pipette tips is between substantially 90° and substantially 180°. Particularly preferably, the angle of rotation a between the first position and the second position of the pipette tips is substantially 180°.

This results in the advantage that the concentricity check of all pipette tips held in the holding device can be carried out at once, i.e. quickly, and also particularly accurately due to the respective rotation of the pipette tips by at least substantially 90°. The accuracy of the measurement can be further increased by a further rotation, i.e. a larger angle of rotation α between the first position and the second position of the pipette tips. This is particularly the case if further images of the pipette tips in intermediate positions are acquired between the first position and the second position.

Preferably, in addition to the first position and the second position for acquiring further images, the pipette tips are rotated into a number of intermediate positions corresponding to the number of further images. These intermediate positions are located between the first position and the second position. In other words, the one or more intermediate positions, starting from the first position, are obtained by rotating the pipette tips by a rotation angle α', the rotation angle α' being between 0° and 180°. The intermediate positions are moreover preferably evenly distributed between the first position and the second position.

By acquiring more images through the second image acquisition device, the accuracy of the inspection is increased.

Preferably, the number of intermediate positions and the number of further images is one to four, whereby a particularly favorable ratio is achieved between measurement accuracy, the amount of data acquired and to be processed, and the speed of the method.

In a preferred embodiment of the method according to the invention, the pipette tips are each held non-positively on the pick-up elements of the holding device. The non-positive connection can be made in a particularly efficient and reliable manner by applying negative pressure to the pipette tips.

In a preferred embodiment of the method according to the invention, the pipette tips are positioned between the second image acquisition device and an illumination device arranged fixed relative to the second image acquisition device during the acquisition of the second image data in step d). The illumination device emits light onto the second image acquisition device in the direction opposite to the optical axis of the second image acquisition device.

This allows the contrast of the pipette tips positioned in the beam path of the second image acquisition device to be increased relative to the image background formed by the illumination device, further increasing the accuracy of the inspection of the pipette tips in step d).

In a preferred embodiment of the method according to the invention, the data processing system controls a movement device for the controlled motorized movement of the holding device in the direction of an X, Y and Z spatial axis. In particular, the movement device is controlled only for the controlled motorized movement of the holding device in the direction of an X and Y spatial axis. By a correspondingly suitable arrangement of the positions controlled by the holding device in the individual method steps, the movement requirement of the holding device can be reduced to two dimensions, which reduces the complexity of the process as well as of the apparatus used to carry out the method and thus leads to lower acquisition and operating costs.

In a preferred embodiment of the method according to the invention, the data processing system comprises a user interface and the method comprises the additional method step: h) selection by a user of at least one pick-up element of the holding device, wherein the pipette tips held on the selected pick-up elements are discarded as rejects as a result of the selection independently of the acquired first and second image data in step f). Step h) is performed prior to any of steps a) to f).

The provision of a user interface which allows the manual selection of at least one pick-up element of the holding device or the deselection of the pipette tips respectively held on this or these pick-up elements by a user brings the advantage that the deselected pipette tips—independently of the image data acquired in step c) and/or step d)—can be treated as rejects in step f) of the method according to the invention. This can be advantageous, for example, if it is already known from a process preceding the method according to the invention that certain positions of the first matrix arrangement contain defective pipette tips. Without wishing to be limited to this explanation, it is assumed that the injection molding of individual cavities producing rejects cannot simply be stopped, as the thermal budget of the injection mold would otherwise become too upset. Manual selection by the user thus represents a second safety instrument which ensures that the pipette tips in question are not dispensed into the second carrier.

In a preferred embodiment of the method according to the invention, step d) also includes, in particular, a surface inspection of the pipette tips to be tested for detecting deviations of the pipette tip surfaces from a predefined standard. For this purpose, the second image acquisition device, the optionally available third image acquisition device and/or one or more further image acquisition devices, whose respective optical axes are aligned transversely to the longitudinal axis of the pipette tips accommodated in the holding device and onto the partial segments of the pipette tip jacket surfaces facing the respective image acquisition device, can be used.

The object is further solved by an apparatus for inspecting pipette tips each extending along a longitudinal axis, which apparatus is adapted in particular for carrying out the method of inspecting pipette tips described herein.

In particular, the object is solved by an apparatus comprising a receiving position configured to provide a first carrier containing pipette tips and a holding device for picking up pipette tips from the first carrier provided at the receiving position. For this purpose, the holding device comprises a plurality of pick-up elements, each of which is configured for receiving one pipette tip. The apparatus according to the invention further comprises a first image acquisition device for acquiring first image data of the respective pipette tip outlet openings of the pipette tips picked up by the holding device, and a second image acquisition device for acquiring second image data of the pipette tips held in the holding device. A data processing system is also provided, which is signal-conductively connected to the first image acquisition device, the second image acquisition device, and the holding device. In the data processing system, allowable limits for the first and/or second image data are predefined, i.e. stored. The apparatus according to the invention further comprises a waste container configured to receive pipette tips discarded by the holding device, and a dispensing position on which a second carrier can be provided. The apparatus according to the invention comprises means for aligning the optical axis of the first image acquisition device parallel to the respective longitudinal axis of the pipette tips held in the holding device and onto the respective pipette tip outlet openings. These means are also configured for aligning the optical axis of the second image acquisition device transversely to the respective longitudinal axis of the pipette tips held in the holding device and onto the partial segments of the respective pipette tip jacket surfaces of the held pipette tips facing the second image acquisition device. The holding device of the apparatus according to the invention is movable back and forth between the receiving position, the first image acquisition device, the second image acquisition device, the waste container and/or the dispensing position.

In a first embodiment of the apparatus according to the invention, the apparatus comprises a receiving position configured to provide a first carrier containing pipette tips in a first matrix arrangement of rows and columns, and a holding device for picking up a row or column of pipette tips from the first matrix arrangement of rows and columns provided at the receiving position. The holding device comprises a plurality of pick-up elements arranged in a row, each of which is configured to receive one pipette tip. The longitudinal axes of the pipette tips held by the pick-up elements lie substantially in a common plane. The apparatus according to the invention further comprises a first image acquisition device for acquiring first image data of the respective pipette tip outlet openings of the pipette tips held by the holding device, and a second image acquisition device for acquiring second image data of the pipette tips held in the holding device. The apparatus according to the invention further comprises a data processing system which is signal-conductively connected to the first image acquisition device, the second image acquisition device and the holding device. In the data processing system, allowable limits for the first and/or second image data are predefined, i.e. stored. The apparatus according to the invention further comprises a waste container configured to receive pipette tips discarded by the holding device, and a dispensing position on which a second carrier having a plurality of holes in a second matrix arrangement of rows and columns can be provided. The holes of the second carrier are thereby suitable for holding the pipette tips. The apparatus according to the invention has means for aligning the optical axis of the first image acquisition device parallel to the respective longitudinal axis of the pipette tips held in the holding device and onto the respective pipette tip outlet holes. These means are also configured for aligning the optical axis of the second image acquisition device substantially perpendicular to the plane defined by the held pipette tips and onto the partial segments of the respective pipette tip jacket surfaces of the held pipette tips facing the second image acquisition device. The holding device of the apparatus according to the invention is movable back and forth between the receiving position, the first image acquisition device, the second image acquisition device, the waste container and/or the dispensing position, and is adapted to successively fill the respective rows or columns of holes of the second carrier with pipette tips without leaving one or more empty holes between two dispensed pipette tips.

Preferably, the receiving position and/or the dispensing position of the first embodiment of the apparatus according to the invention are each adapted to provide at least one rack.

In a second embodiment of the apparatus according to the invention, the pipette tips are arranged in a circular array in the first carrier. The arrangement of the pick-up elements of the holding device corresponds to the circular array of the pipette tips in the first carrier. The circular array is in particular the mold arrangement of an injection molding machine upstream of the apparatus according to the invention.

In a preferred further embodiment of the second embodiment of the apparatus according to the invention, the holding device has means for rotating the holding device about its axis of rotation.

In a preferred further development of the second embodiment of the device according to the invention, the holding device comprises an illumination device fixed to the holding device, which divides the circular array of pipette tips into two halves. The illumination device has two plane-parallel light emitting surfaces for emitting light in opposite directions. Alternatively, it is conceivable that the holding device comprises an illumination device fixed to the holding device and arranged in the center of the circular array of pipette tips for emitting light in the direction of the second image acquisition device. In this alternative, it is particularly advantageous if the illumination device is in the form of a bulb or is cylindrical with a circumferential light emitting surface, since such an illumination device emits light uniformly.

The means for aligning the optical axes of the two image acquisition devices, i.e. the first image acquisition device and the second image acquisition device and, if necessary, the third image acquisition device or the further image acquisition device for acquiring the second image data, and the pipette tips held in the holding device are, for example, a movement device which can be controlled by the data processing system for the controlled motorized movement of the holding device in the direction of an X, Y and Z spatial axis. For the reasons already mentioned for the method according to the invention, the holding device can preferably only be moved in the direction of an X and Y spatial axis by the movement device.

With the aid of the apparatus according to the invention, picked-up pipette tips can each be rotated individually about the axis of rotation of the pipette tips, i.e. about their longitudinal axis, whereby only one camera is required for checking the concentricity of the pipette tips, as will be explained in more detail below.

This saves costs. The individual inspection of each pipette tip also solves the problem of faulty pipette tips entering the packaging container and having to dispose of already packaged, completely filled pipette tip carriers, or of having to replace faulty pipettes with fault-free pipettes at great expense. Such pipette tip carriers are also known as "racks". Instead, faulty pipette tips can be sorted out beforehand, for example by discarding these faulty pipette tips into a container provided for rejects by the device. Thus, only pipette tips that meet the quality requirements predefined in each individual case are transferred by the device into packaging containers.

In a preferred embodiment, the data processing system of the apparatus according to the invention is connected in a signal-conducting manner to an injection molding machine upstream of the apparatus according to the invention, which produces pipette tips in multiple cavities in an injection mold. The pipette tips removed from the cavities of the injection mold can be traceably transferred to the first matrix arrangement of pipette tips described herein. In other words, it is possible to track from which cavity of an injection mold a pipette tip originates at a particular position in the first matrix arrangement. By continuously monitoring the quality of each pipette tip by the method or apparatus of the invention, the data processing system of the apparatus of the invention can automatically determine which cavity is causing problems and thereafter deselect the affected cavity or cavities. As described previously, the pipette tips originating from a deselected cavity—regardless of the image data acquired in step c) or step d) of the method according to the invention—are treated as rejects and are in no case dispensed in the second carrier in step g) of the method according to the invention.

In a preferred embodiment, the apparatus according to the invention further comprises a measuring device for detecting the entry of the respective pipette tips, in particular the respective pipette tip outlet openings, into the optical axis of the first image acquisition device. The measuring device is connected to the first image acquisition device in a signal-conducting manner and is configured to trigger the acquisition of the first image data by the first image acquisition device. Preferably, the measuring device for detecting the entry of the respective pipette tips into the optical axis of the first image acquisition device is a light barrier.

Such a measuring device for triggering image acquisition has the advantage that it can accelerate the acquisition of the first image data.

In a preferred embodiment of the device according to the invention, the holding device has means for rotating the pipette tips held in the holding device about their longitudinal axis. The means for rotating the pipette tips are thereby configured to rotate the pipette tips from a first position into a second position by a rotation angle $\alpha$ of at least substantially 90°. Preferably, the angle of rotation $\alpha$ between the first position and the second position of the pipette tips is between substantially 90° and substantially 180°. Particularly preferably, the angle of rotation $\alpha$ between the first position and the second position of the pipette tips is substantially 180°.

Preferably, the means for rotating the pipette tips held in the holding device comprise a gearwheel on each pick-up element. The gearwheels of adjacent pick-up elements mesh to form a gear train and can be rotated by a rotary drive. The rotary drive is preferably arranged at one end of the gear-wheel assembly. This allows the holding device to be designed in a particularly compact and space-saving manner.

Alternatively, the means for rotating the pipette tips held in the holding device comprise a gearwheel on each pick-up element, whereby two adjacent gearwheels are operatively connected to one another via an intermediate gearwheel to form a gear train. In this case, at least one of the gearwheels or one of the intermediate gearwheels of the gear train can be rotated by a rotary drive. As a result, the entire gear train can be rotated.

Alternatively, the gearwheels of adjacent pick-up ele-ments, each arranged on a pick-up element, may not mesh with each other. In this case, the gearwheels can be rotated by a common rack-and-pinion drive or via a common toothed belt. As a result, all the gearwheels and thus all the pick-up elements can be rotated in the same direction by the rack-and-pinion drive or the toothed belt.

When using a toothed belt, it is advantageous to provide support means for ensuring the operative connection between the gearwheels and the toothed belt. The support means prevent the toothed belt from lifting off the gear-wheels and thus ensure uninterrupted and safe drive of the respective gearwheels. It is particularly preferred to arrange the support means in the area of each contact point of the gearwheels with the toothed belt.

Alternatively, the means for rotating the pipette tips held in the holding device comprise an individual drive, for example an electric motor, on each pick-up element. This means that each pick-up element can be rotated indepen-dently of the remaining pick-up elements of the holding device by means of its individual drive.

Alternatively, the means for rotating the pipette tips held in the holding device comprise a disk on each pick-up element, which disk is arranged on the respective pick-up element in a rotationally fixed manner in the circumferential direction of the latter. A rod drive is attached to the discs eccentrically in relation to the longitudinal axis of the respective pick-up element. The rod drive converts a recip-rocating motion of a drive rod into a rotary motion of the mounting elements.

In a preferred embodiment of the apparatus according to the invention, the means for rotating the pipette tips held in the holding device are configured to rotate the pipette tips into intermediate positions between the first position and the second position. In particular, the means for rotating the pipette tips held in the holding device are configured to rotate the pipette tips into one to four intermediate positions between the first position and the second position.

Preferably, the intermediate positions are evenly distrib-uted between the first position and the second position, which allows a particularly reliable check of the concen-tricity of the respective pipette tips.

In a preferred further development of the first embodi-ment of the apparatus according to the invention, the number of pick-up elements of the holding device corresponds to the number of pipette tips provided in a row or column of the first matrix arrangement.

By matching the number of pick-up elements and the number of elements, i.e. pipette tips, of a row and/or column of the first matrix arrangement, the apparatus according to the invention is particularly suitable for efficiently carrying out the method according to the invention, since the holding device in step b) of the method according to the invention can pick up an entire row or column from the first matrix arrangement at a time and feed it to the image acquisition devices.

Preferably, the holding device comprises at least five, preferably at least ten and even better at least fifteen pick-up elements, since the advantages of the method according to the invention, in particular with regard to its efficiency and speed, are further increased with an increasing number of pipette tips tested simultaneously.

In a preferred embodiment of the device according to the invention, the pick-up elements each have a coupling ele-ment with a vacuum connection in order to hold the pipette tips on the pick-up elements of the holding device by applying a vacuum to the tip. The coupling elements are adapted in such a way that they can be inserted into the attachment end of a pipette tip opposite the pipette tip outlet opening and, after the pipette tip has been subjected to negative pressure, a substantially form-fitting fit and thus a certain tightness is created between the coupling element and the pipette tip.

Such a design of the pick-up elements has the advantage that the pipette tips are reliably held and can also be easily dispensed again by releasing the vacuum in the held pipette tips. A separate ejection device for ejecting the pipette tips from the pick-up elements is preferably not required.

Preferably, the pick-up elements are conically shaped, which facilitates the insertion of the pick-up elements into the attachment end of the pipette tips, increases the tightness between the pick-up element and the pipette tip, and also achieves a certain frictional press fit between the coupling element and the coupling area of the pipette tip located near the attachment end, which results in a particularly secure retention of the pipette tips on the respective pick-up ele-ments.

In a preferred embodiment, the apparatus according to the invention comprises an illumination device which is fixedly arranged relative to the second image acquisition device. The illumination device is configured to emit light in the direction opposite to the optical axis of the second image acquisition device onto the second image acquisition device. This allows the contrast between the pipette tips and the background formed by the illumination device to be increased and the acquisition of the second image data by the second image acquisition device to be improved, as described above.

In a preferred embodiment, the data processing system of the apparatus according to the invention comprises a user interface configured for selection of at least one pick-up element of the holding device by a user. As a result of the selection, the pipette tips held on the selected pick-up elements are discardable as rejects regardless of the acquired first and second image data. As described above, this makes it possible to exclude the possibility that pipette tips which have already been identified as defective in advance of the method according to the invention are dispensed into the second carrier.

In a preferred further development of the first embodi-ment of the apparatus according to the invention, the pick-up elements of the holding device are configured to be movable with respect to each other. This allows their position relative to each other to be adapted to the first matrix arrangement and/or the second matrix arrangement of pipette tips, whereby the apparatus according to the invention is variable and can be flexibly adapted to different needs, i.e. different first and/or second matrix arrangements.

The object is further solved by an injection molding machine for the production and packaging of pipette tips, wherein the injection molding machine according to the invention comprises at least one apparatus according to the invention for inspecting pipette tips.

Figures 2B, 2C:
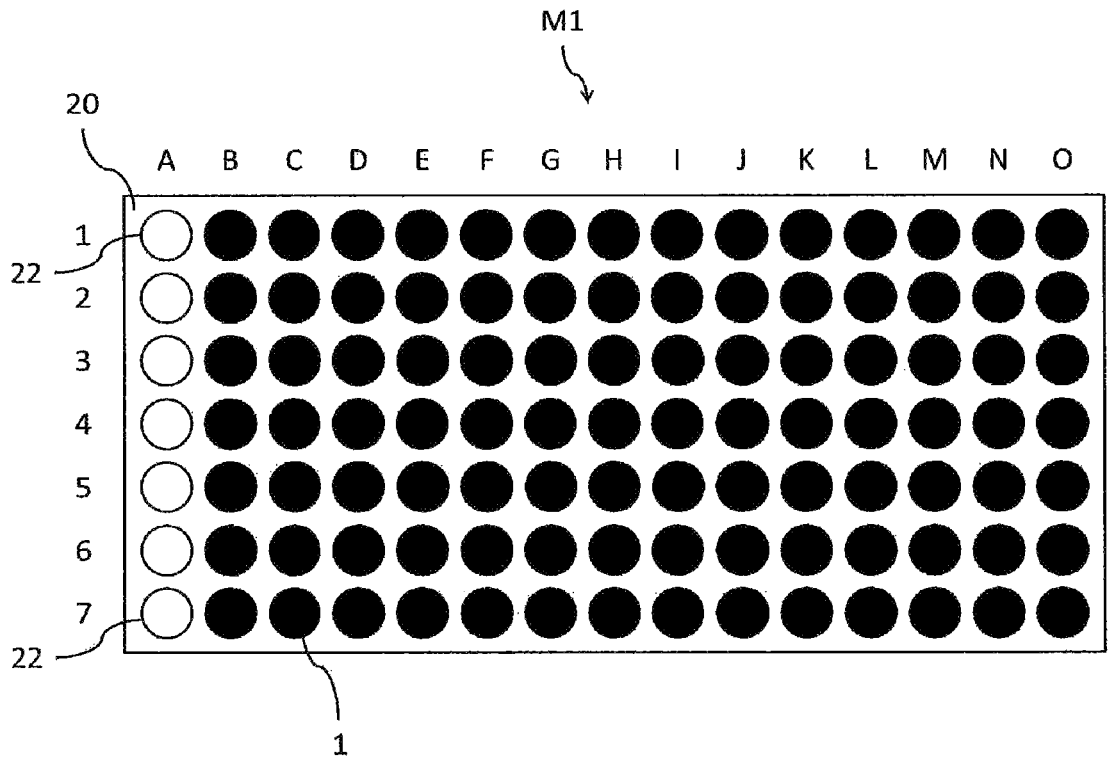
Figure 2D:
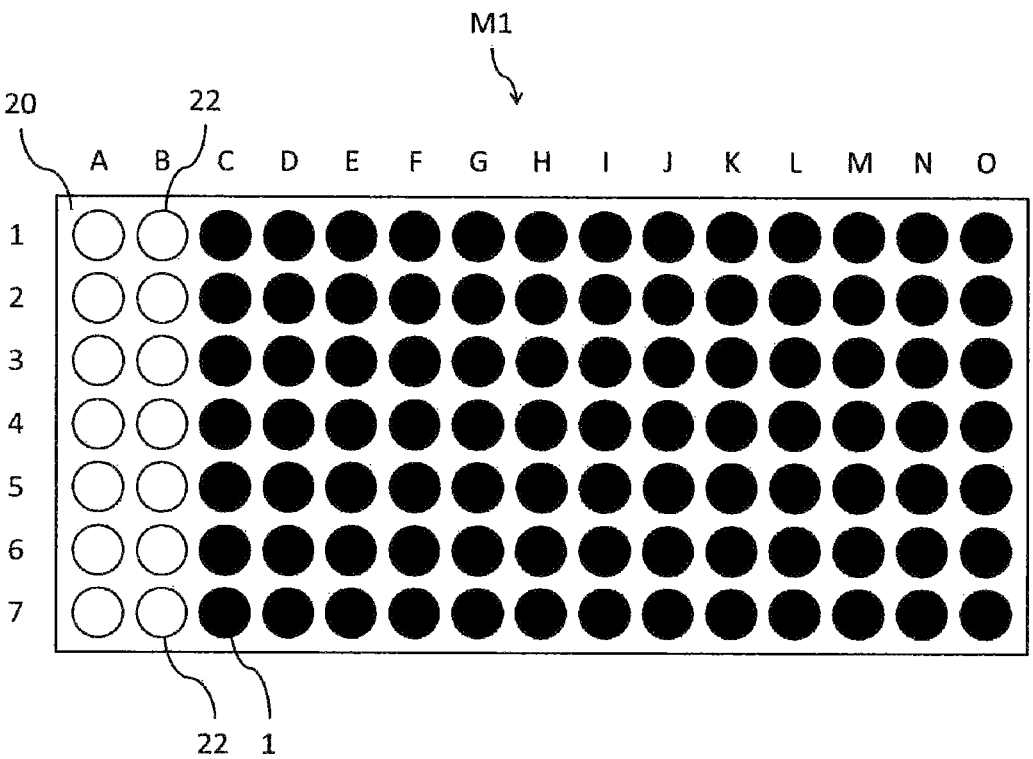
Figure 2E:
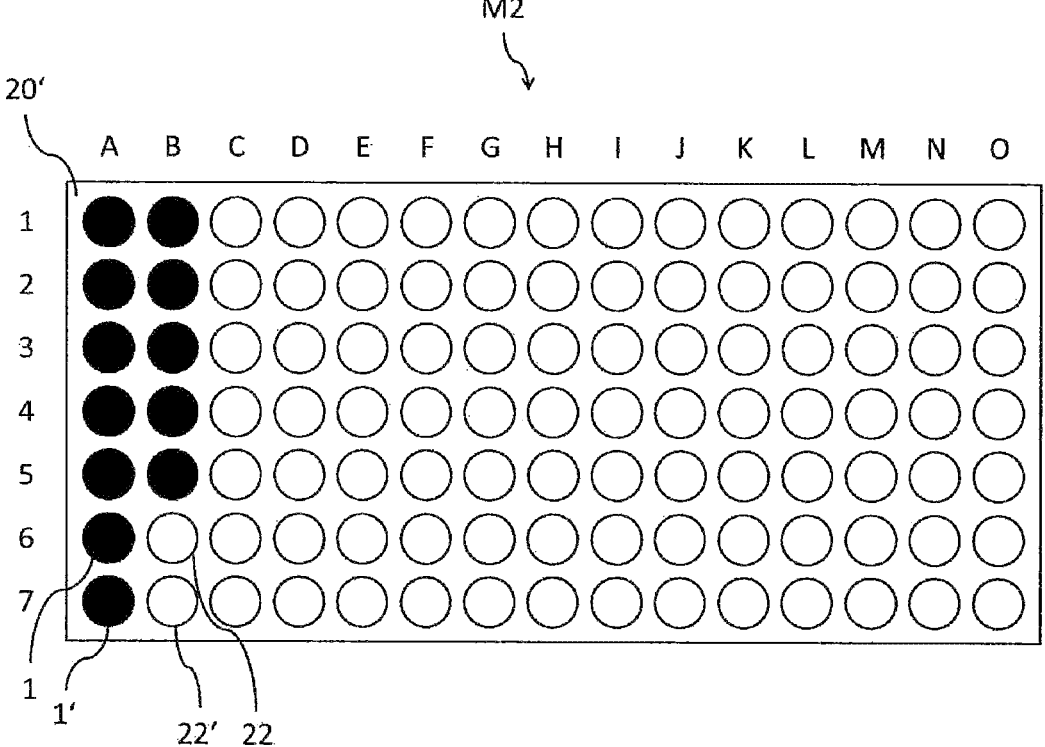
Figure 3A:
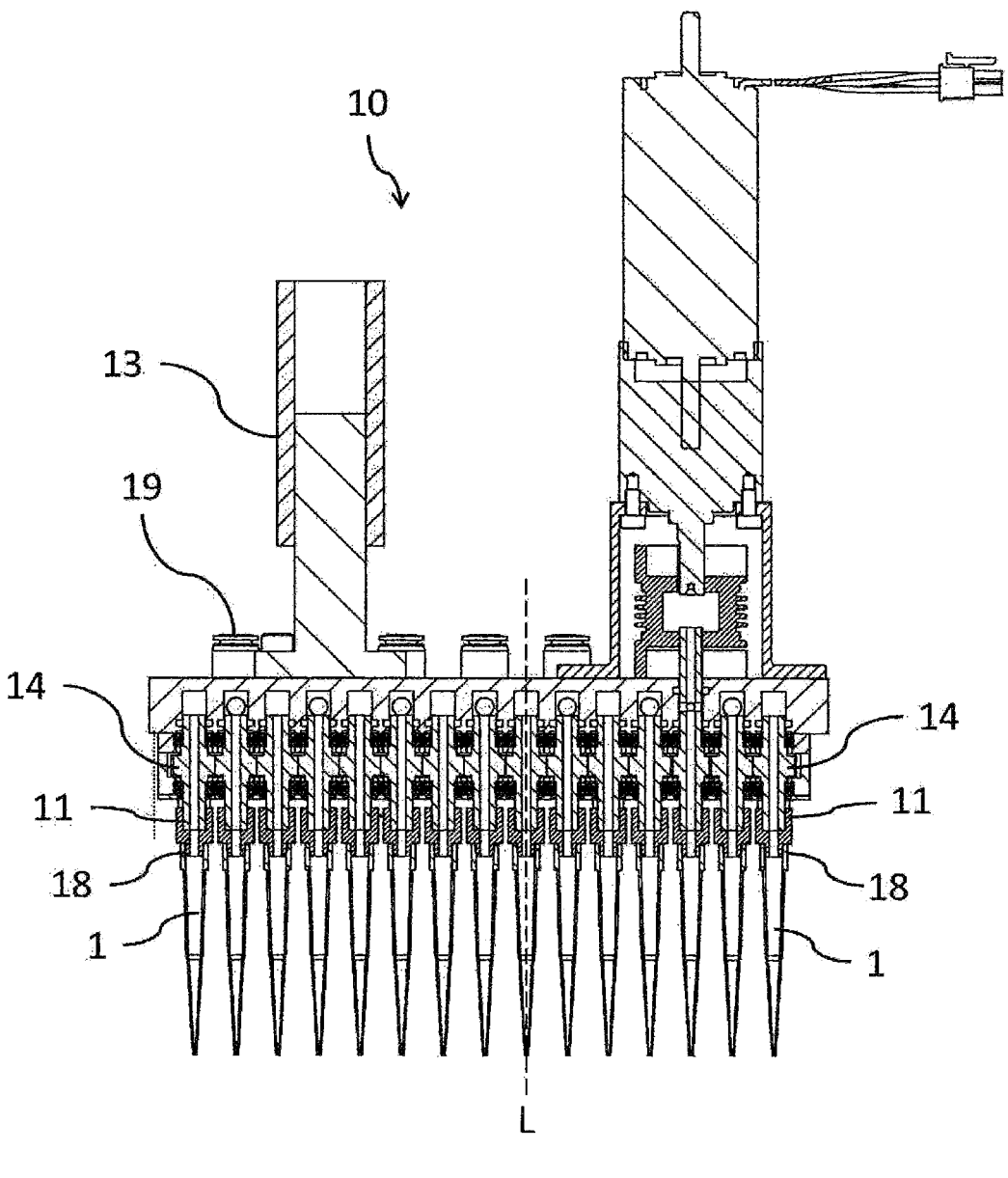
Figure 3B:
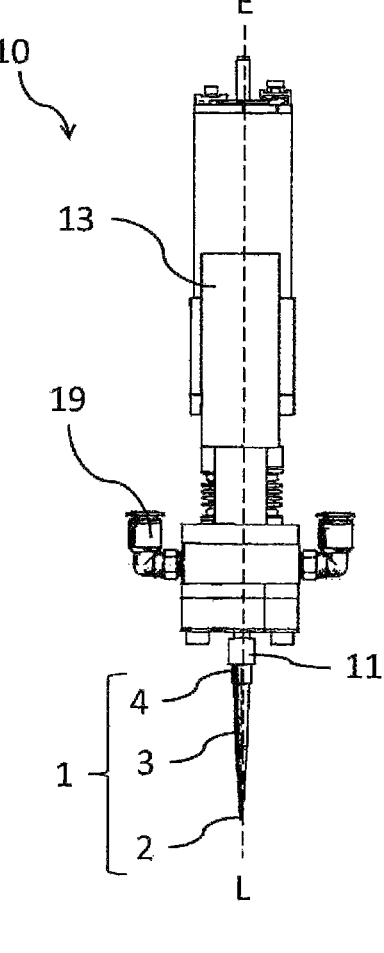

Further advantages, features and details of the invention are explained in more detail below with reference to drawings, in which identical or analogous elements are basically provided with the same reference signs. The figures show:

FIG. 1: A flowchart of a variant of the method of inspecting pipette tips;

FIG. 2*a*: A schematic representation of a first matrix arrangement of pipette tips in step a) of the method shown in FIG. 1;

FIG. 2*b*: A schematic representation of the matrix arrangement of pipette tips from FIG. 2*a* after step b) of the method shown in FIG. 1;

FIG. 2*c*: A schematic representation of a carrier with holes arranged in a second matrix arrangement for receiving pipette tips after carrying out step g) of the method illustrated in FIG. 1;

FIG. 2*d*: A schematic representation of the first matrix arrangement of pipette tips of FIG. 2*b* after performing step b) of the method shown in FIG. 1 again;

FIG. 2*e*: A schematic representation of the carrier from FIG. 2*c* after carrying out step g) of the process shown in FIG. 1 again;

FIG. 3*a*: A holding device with a plurality of pick-up elements for holding pipette tips in a longitudinal section;

FIG. 3*b*: A front side view of the holding device from FIG. 3*a;*

Figure 3C:
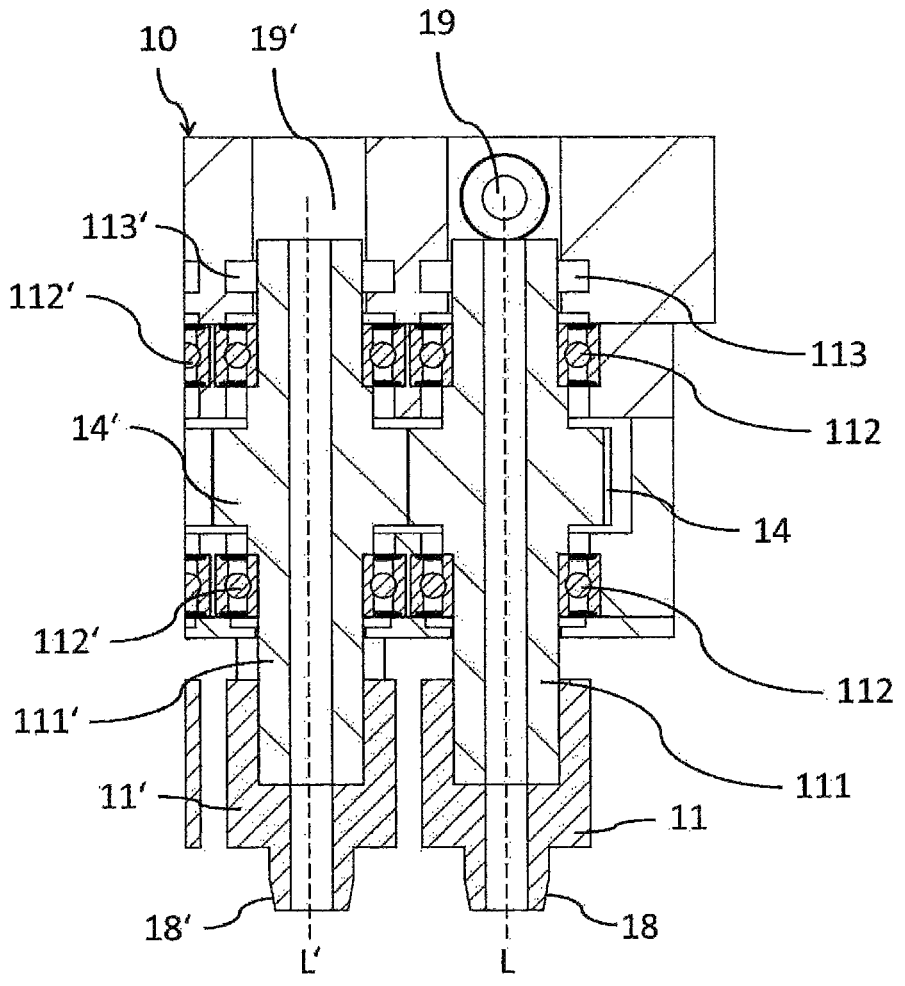
Figure 4A:
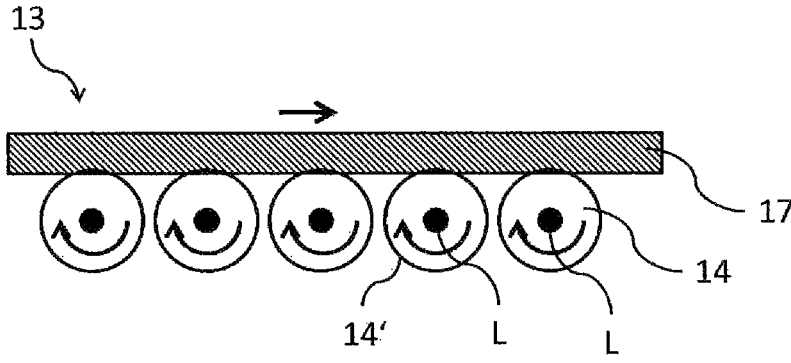
Figure 4B:
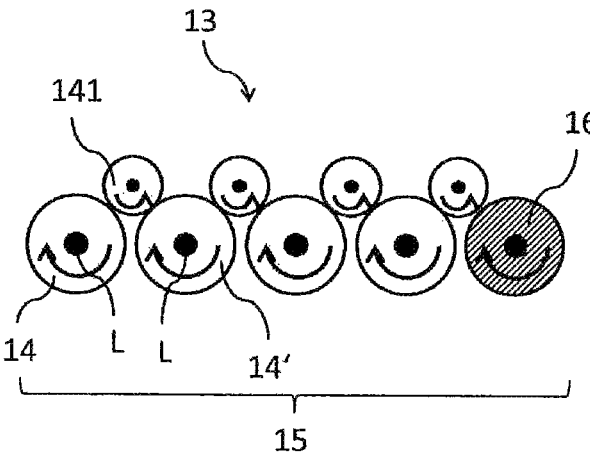
Figure 4C:
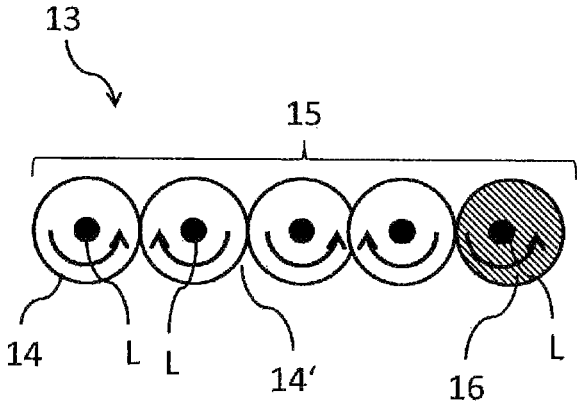
Figure 4D:
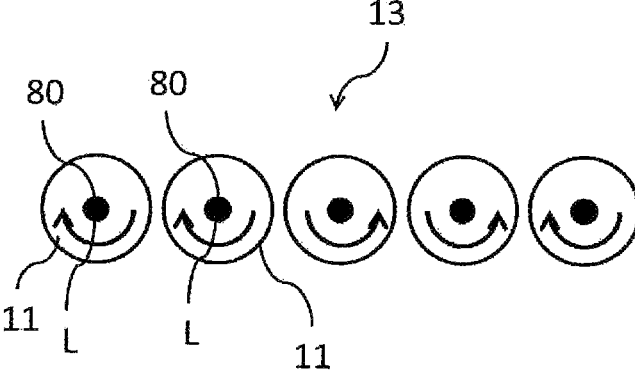
Figures 4E, 4F:
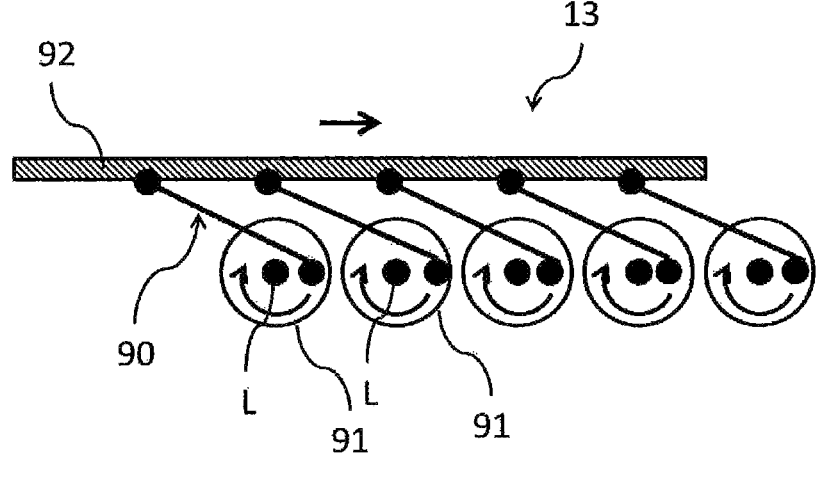
Figure 6:
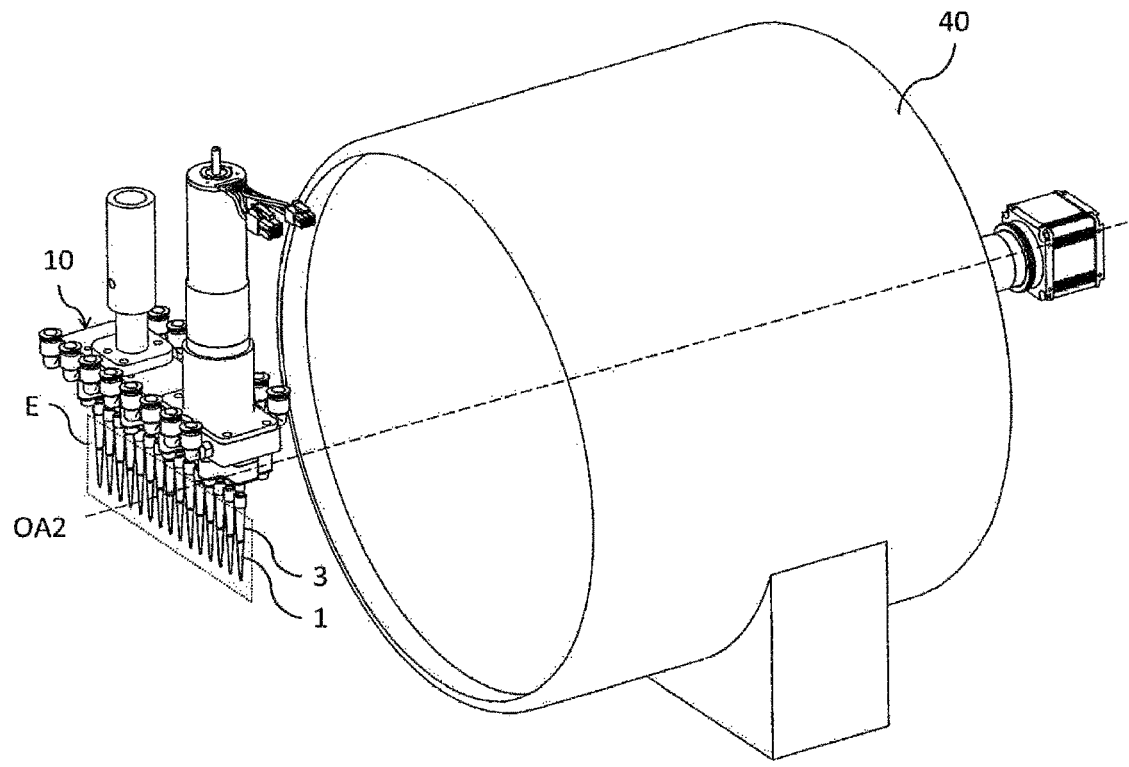
Figure 7:
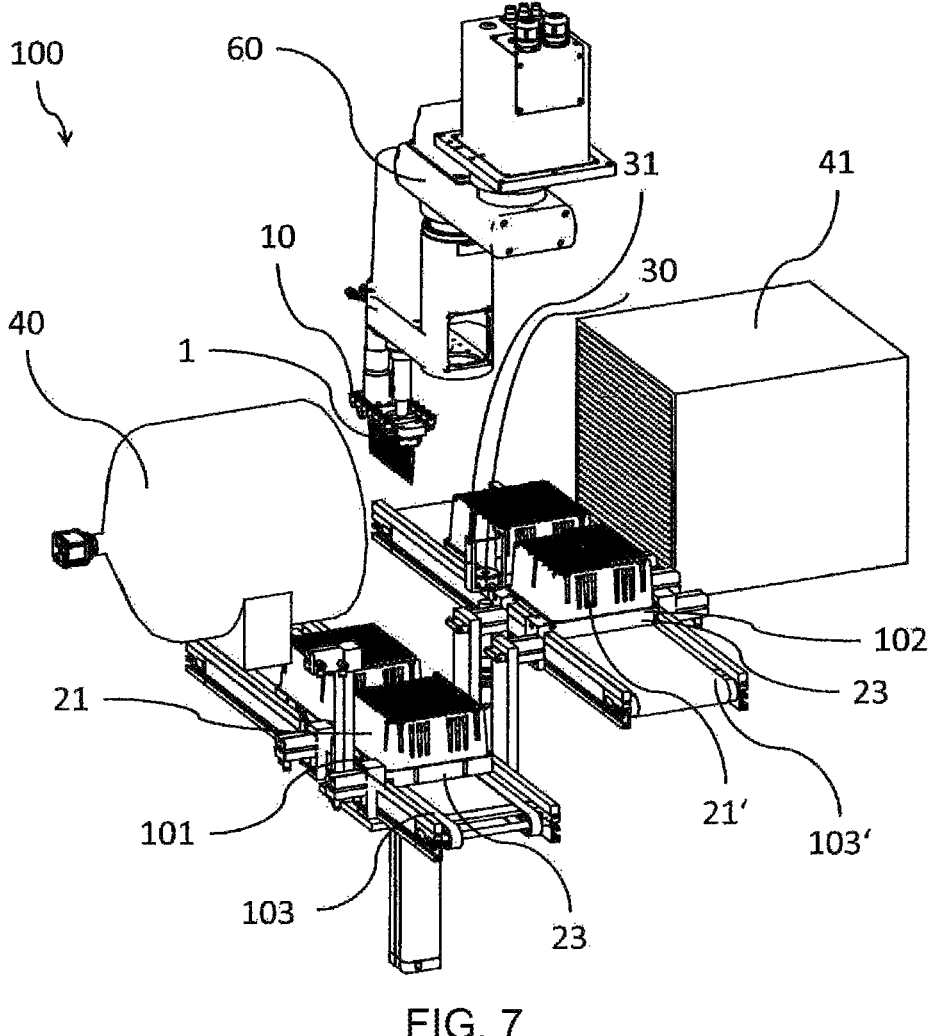
Figure 8:
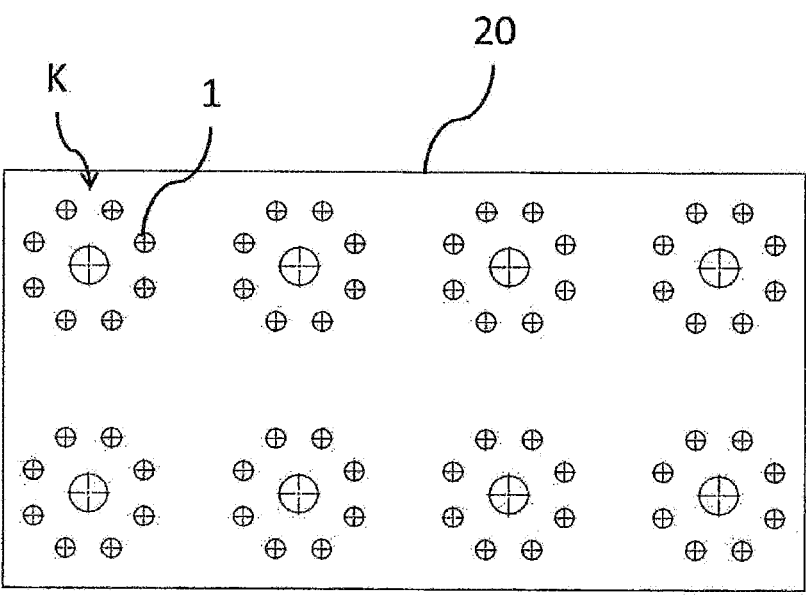
Figure 9A:
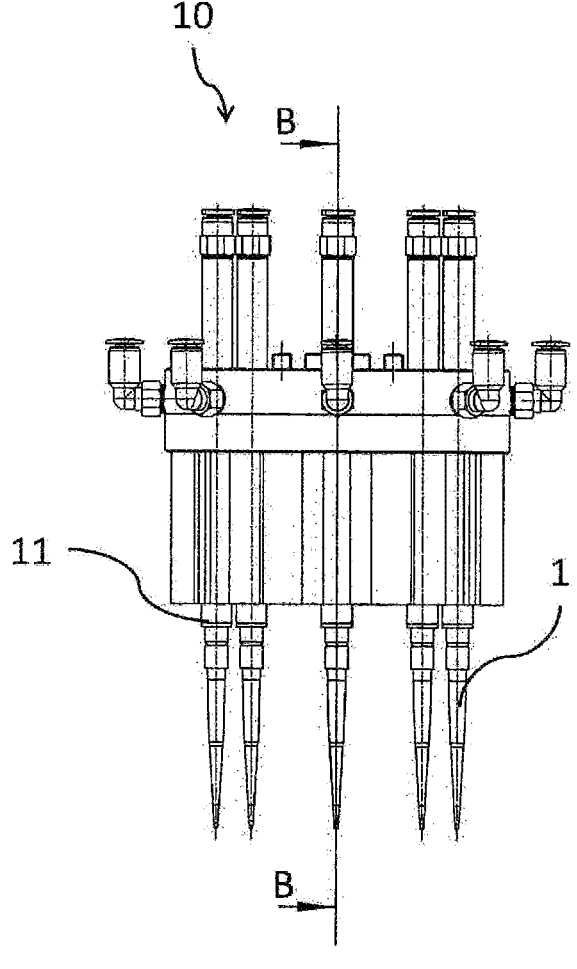
Figure 9B:
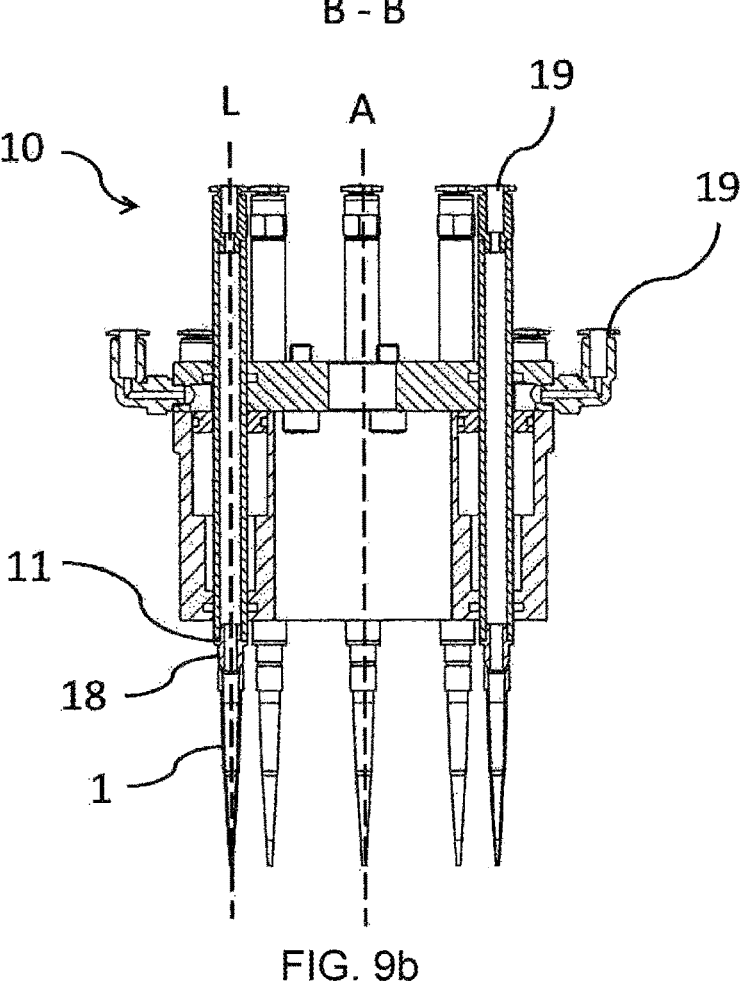

FIG. 3*c*: A section of the holding device shown in FIG. 3*a* without pipette tips;

FIG. 4*a*: A schematic representation of an embodiment of means for rotating pipette tips, comprising a rack-and-pinion drive;

FIG. 4*b*: A schematic representation of a further embodiment of means for rotating pipette tips, comprising a gear train with intermediate gearwheels;

FIG. 4*c*: A schematic representation of a further embodiment of means for rotating pipette tips, comprising a gear train of directly meshing gearwheels;

FIG. 4*d*: A schematic representation of a further embodiment of means for rotating pipette tips, comprising individual drives;

FIG. 4*e*: A schematic representation of a further embodiment of means for rotating pipette tips, comprising a rod drive;

FIG. 4*f*: A schematic representation of a further embodiment of means for rotating pipette tips, comprising a toothed belt drive FIG. 5: A perspective view of an arrangement comprising a holding device and a first image acquisition device;

FIG. 6: A perspective view of an arrangement comprising a holding device and a second image acquisition device;

FIG. 7: A perspective view of a variant of the apparatus for inspecting pipette tips;

FIG. 8: A schematic illustration of a carrier for providing pipette tips in a plurality of circular arrays of pipette tips;

FIG. 9*a*: A holding device with a plurality of circularly arranged pick-up elements for holding pipette tips in a side view;

FIG. 9*b*: A longitudinal section through the holding device of FIG. 9*a* along line B-B in FIG. 9*a;*

Figure 9C:
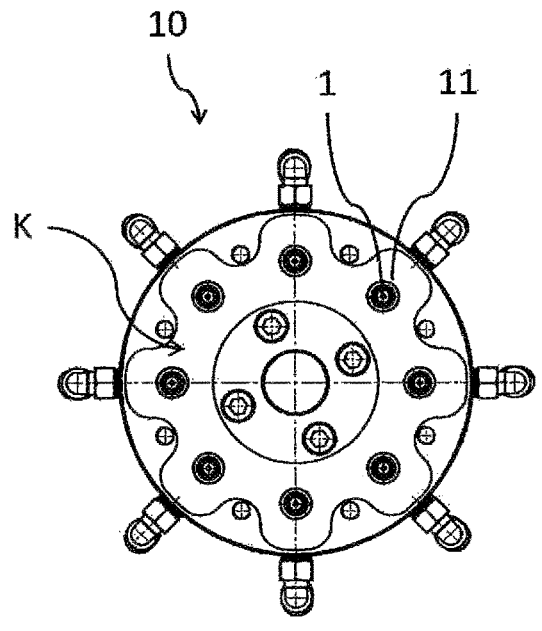

FIG. 9*c*: A bottom view of the holding device from FIG. 9*a;*

Figure 10A:
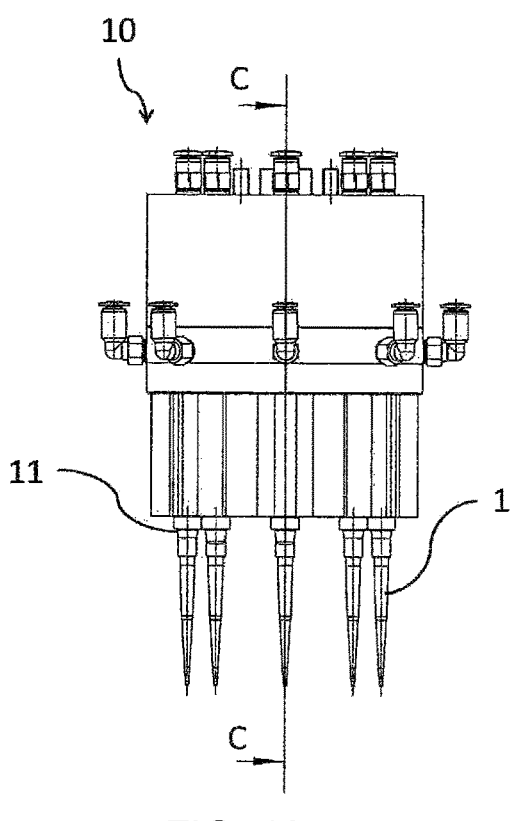
Figure 10B:
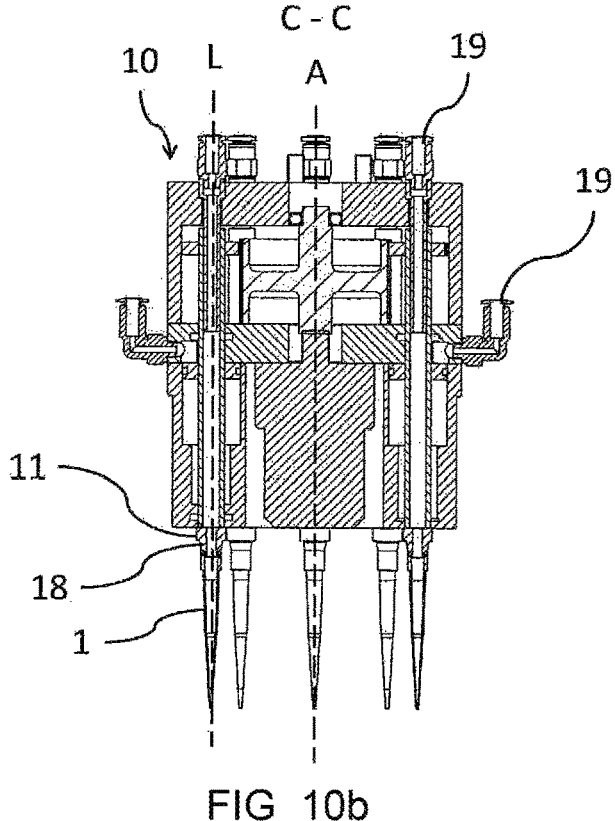

FIG. 10*a*: A further embodiment of a holding device with a plurality of circularly arranged pick-up elements for holding pipette tips in a side view;

FIG. 10*b*: A longitudinal section through the holding device of FIG. 10*a* along line C-C in FIG. 10*a;*

Figure 11A:
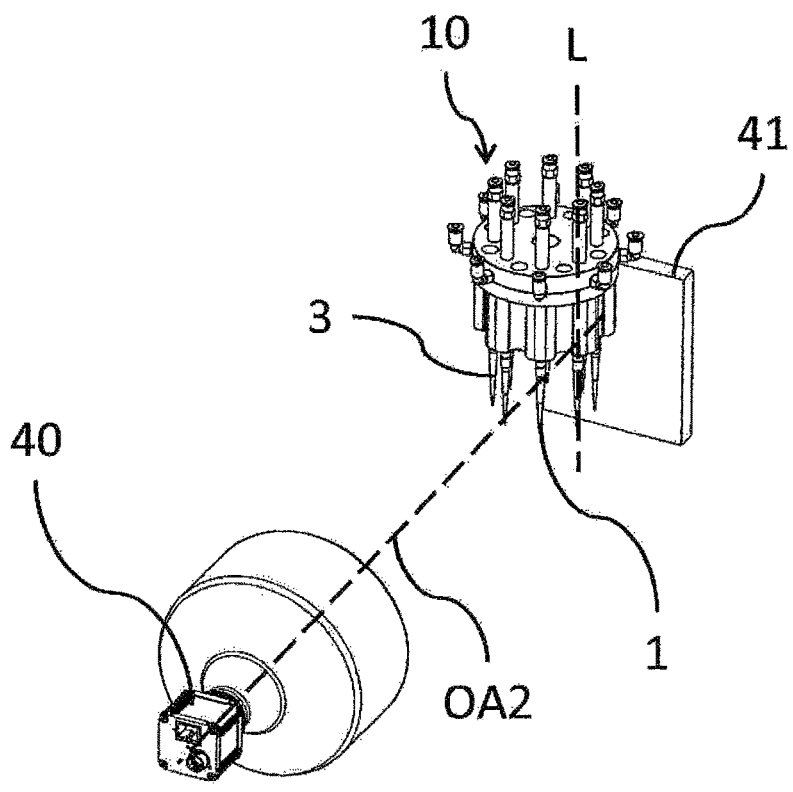
Figure 11B:
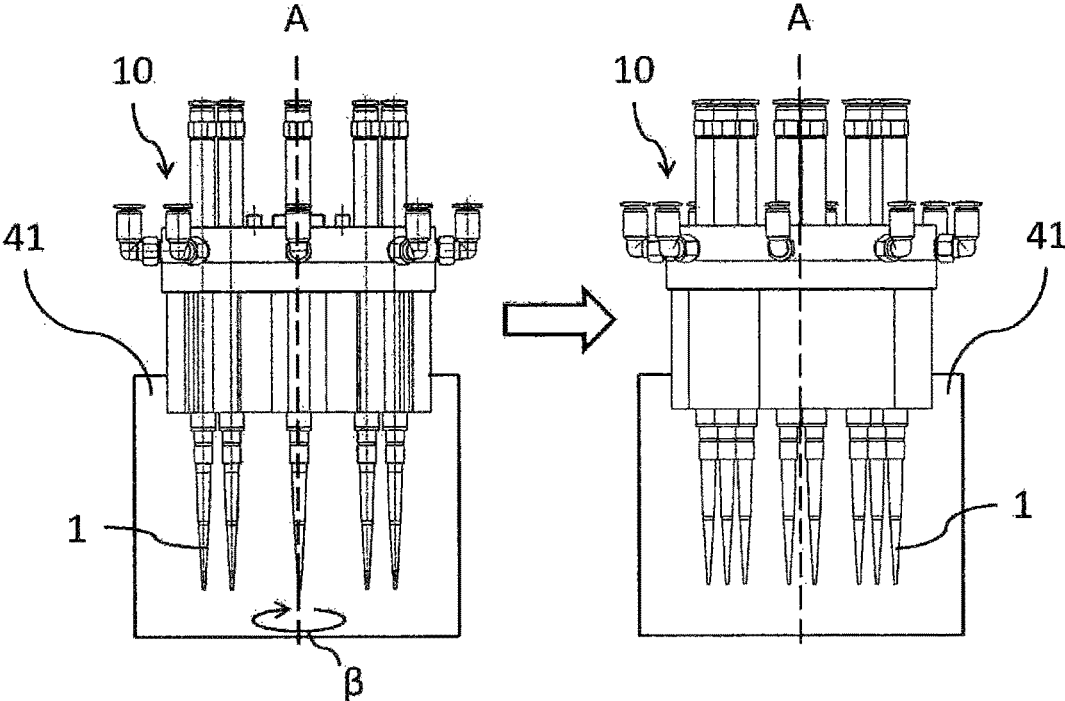

FIG. 11*a*: A perspective view of an arrangement comprising a holding device and a second image acquisition device;

FIG. 11*b*: The holding device of FIG. 11*a* as seen from the second image acquisition device in FIG. 11*a;*

Figure 12A:
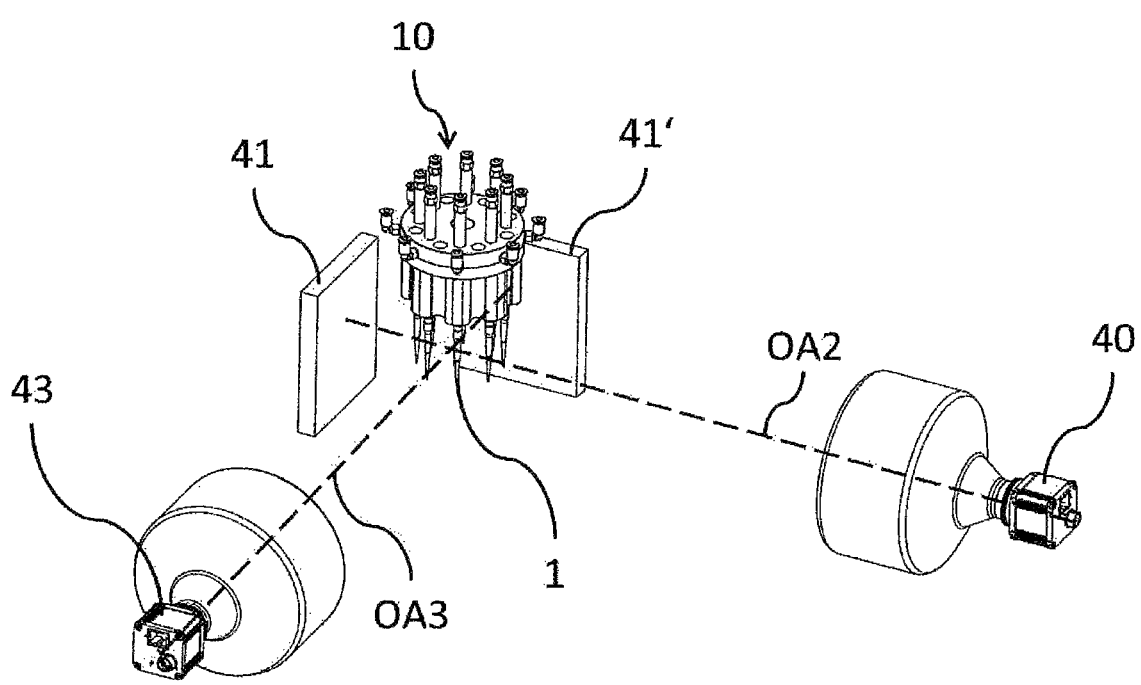
Figure 12B:
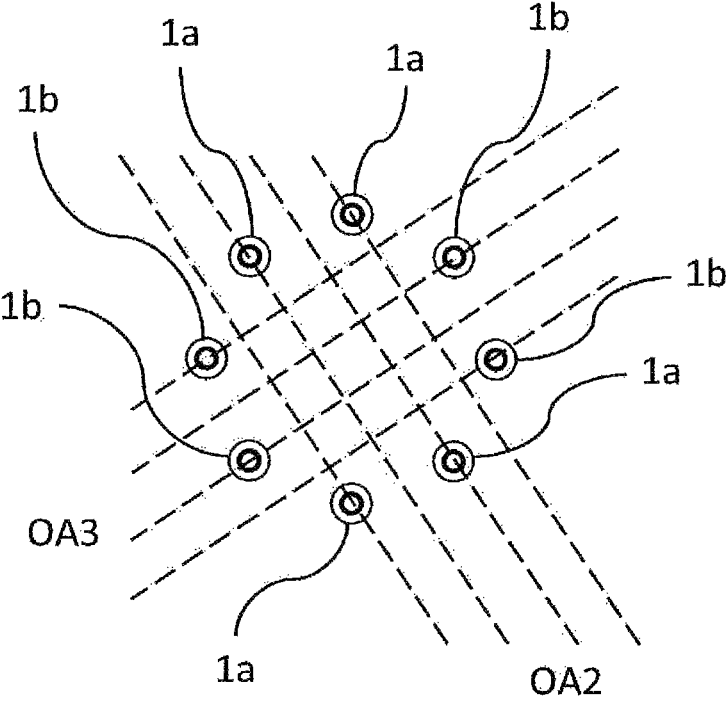
Figure 13A:
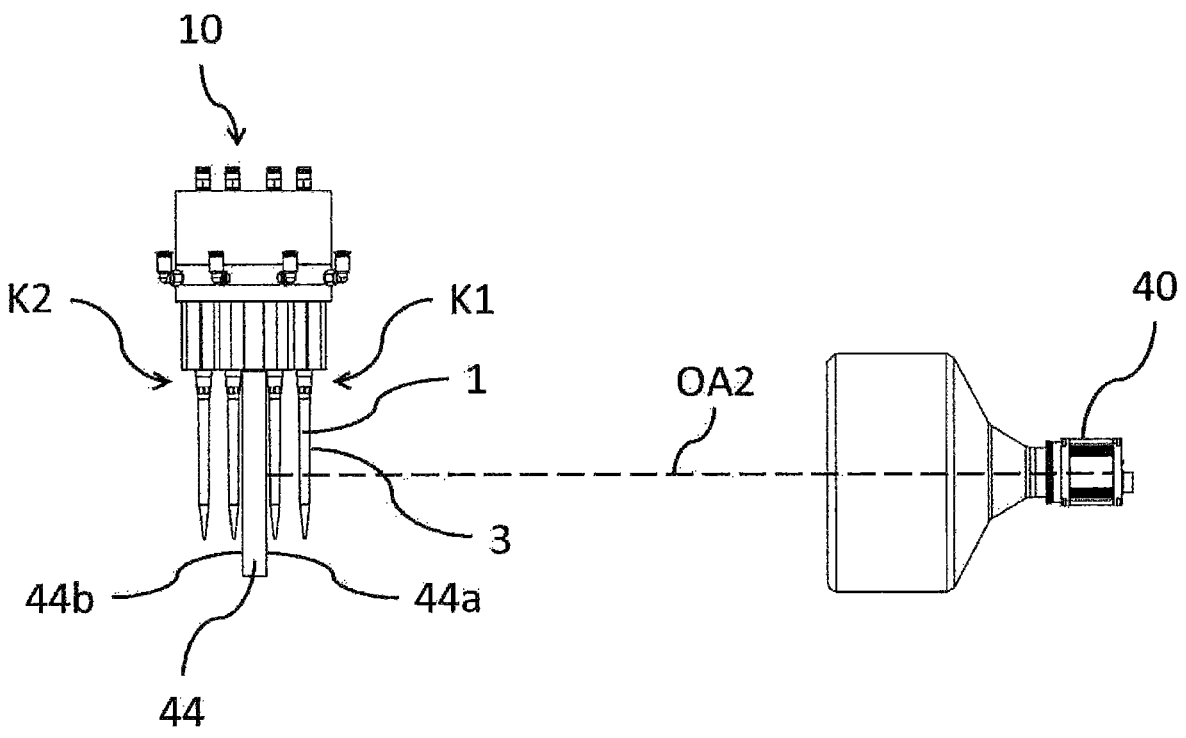
Figure 13B:
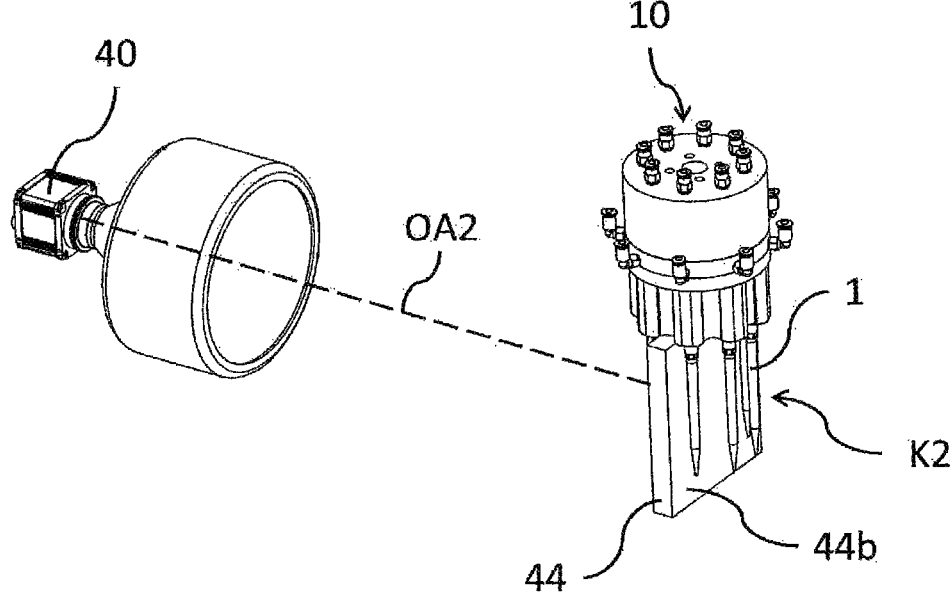

FIG. 12*a*: A perspective view of an arrangement comprising a holding device, a second image acquisition device, and a third image acquisition device;

FIG. 12*b*: A schematic representation of the beam path of the two optical axes from FIG. 12*a* through the circular array of the pipette tips held in the holding device;

FIG. 13*a*: A side view of an arrangement comprising a holding device with an illumination device attached thereto and a second image acquisition device;

FIG. 13*b*: A perspective view of the arrangement from FIG. 13*a*.

FIG. 1 shows a schematic flowchart of a variant of the method according to the invention for inspecting pipette tips according to the first embodiment. The method comprises providing pipette tips in a first matrix arrangement M1 of rows and columns in method step a). The provided pipette tips are picked up from the first matrix arrangement M1 of pipette tips in step b) by a holding device 10, as will be described in further detail with respect to FIGS. 2*a*, 2*b*, 2*d*. The pipette tips picked up in step b) are fed to a first image acquisition device 30 in step c) for acquiring first image data of the pipette tips, as still detailed to FIG. 5. Subsequently, in step d), the pipette tips held on the holding device are fed to a second image acquisition device 40 for acquiring second image data of the pipette tips, as will be detailed with respect to FIG. 6. After the acquisition of the first and second image data of the pipette tips in steps c) and d), a data processing system 70 of the apparatus with which the method according to the invention is carried out determines whether or not the first and/or second image data are within predefined allowable limits. These allowable limits are stored in data processing system 70. In the embodiment example shown in FIG. 1, the evaluation of the first and/or second image data in step e) showed that some of the pipette tips inspected in step c) and step d) are outside the predefined allowable limits. Thereupon, in step f), the holding device 10 is moved over an opening of a waste container 50 and the faulty pipette tips are discarded into the waste container 50. Finally, those pipette tips whose first and second image data determined in step e) are within the predefined allowable limits are dispensed into a second carrier having a plurality of holes suitable for holding the dispensed pipette tips and arranged in the second carrier in a second matrix arrangement M2 of rows and columns, as will be described in detail with respect to FIGS. 2*c* and 2*e*. Alternatively, it is possible for all of the pipette tips picked up in step b) to be within the predefined allowable limits, as shown by the dashed line in FIG. 1. The holding device 10 is attached to a movement device 60 for motorized movement of the holding device 10, which movement device 60 moves the holding device 10 to and from the individual stations of the process steps a) to g).

FIG. 2*a* shows a schematic top view of a first carrier 20 having a plurality of holes 22 for holding pipette tips 1, which holes 22 are arranged in a first matrix arrangement M1 in the first carrier 20. In the embodiment shown, each of the holes 22 in the first carrier 20 holds one pipette tip 1 such that the first carrier 20 provides a total of one hundred and five pipette tips 1. The first matrix arrangement M1 thus consists of fifteen columns A-O and seven rows of holes 22. For example, the first carrier 20 shown in FIG. 2*a* is the perforated plate of a rack for pipette tips. The situation shown in FIG. 2*a* represents only one possible initial situation of step a) of the method for inspecting pipette tips shown in FIG. 1, i.e. an initial situation in which a first carrier 20 completely filled with pipette tips 1 is provided in step a) of the method according to the invention. However, according to the invention, it is also conceivable that the first carrier 20 provided in step a) of the method according to the invention is not or no longer completely filled with pipette tips 1, as described below for FIG. 2*c*, and/or the first matrix arrangement has one or more free spaces between two adjacent pipette tips 1, 1'.

FIG. 2*b* shows a schematic top view of the first carrier 20 shown in FIG. 2*a* after a complete column of pipette tips 1 has been picked up from the first matrix arrangement M1 by a holding device (not shown) in step b) of the method shown in FIG. 1, the complete column comprising positions A1 to A7 of the first carrier 20 in the embodiment example shown.

FIG. 2*c* shows a schematic top view of a second carrier 20' with a plurality of holes 22 for holding pipette tips 1, which holes 22 are arranged in a second matrix arrangement M2 in the second carrier 20'. The second carrier 20' shown in FIG. 2*c* corresponds to the carrier of FIG. 2*a* with respect to the number and arrangement of the holes 22, i.e. the first matrix arrangement M1 and the second matrix arrangement M2 are identical in this variant of the method according to the invention for inspecting pipette tips 1. However, according to the invention, it is also conceivable that the first matrix arrangement M1 and the second matrix arrangement M2 differ from each other, in particular with respect to the number of rows and columns and/or with respect to the spacing of the holes 22 in the carriers 20, 20' relative to each other, which holes 22 define the respective matrix arrangement. In the carrier shown in FIG. 2*c*, the holes 22 on positions A1 to A5 of the second carrier 20' were each occupied by a pipette tip 1 in step g) of the process shown in FIG. 1, whereas the two remaining holes 22 of column A, i.e. positions A6 and A7, remained unoccupied in step g). The situation shown in FIG. 2*c* arises, based on the situation shown in FIG. 2*b*, in that step e) of the procedure shown in FIG. 1 revealed that the first and/or second image data acquired in steps c) and d) from two of the seven pipette tips acquired in step b) did not lie within predefined allowable limits (not shown). Subsequently, these two pipette tips 1 determined in step e) were discarded by the holding device into a waste container in step f) of the method shown in FIG. 1 (not shown). According to the invention, the five remaining pipette tips 1, whose first and second image data determined in step e) lie within the predefined allowable limits, were dispensed by the holding device into the second carrier 20' in such a way that the holes 22 were filled with the positions A1 to A5 of column A of the second carrier 20' one after the other, without one or more empty holes 22 remaining between two dispensed pipette tips 1.

FIG. 2*d* shows a schematic top view of the first carrier 20 shown in FIG. 2*b*, after in a further step b) of the method shown in FIG. 1 a further complete column of pipette tips 1 has been picked up by a holding device (not shown) from the first matrix arrangement M1, the complete column in the embodiment example shown in FIG. 2*d* comprising positions B1 to B7 of the first carrier 20.

FIG. 2*e* shows a schematic top view of the second carrier 20' of FIG. 2*c*, after in a further step g) of the method shown in FIG. 1 the seven pipette tips 1, which—as shown in FIG. 2*d*-were picked up by a holding device from column B of the first carrier 20, were dispensed into the second carrier 20' in such a way that the two empty holes 22, 22' with positions A6 and A7 of column A of the second carrier 20' were first filled one after the other with one pipette tip 1 each and then the remaining five pipette tips 1 were dispensed into the holes 22 with positions B1 to B5 of column B of the second carrier 20' without one or more empty holes 22 remaining between two dispensed pipette tips 1. Steps b) to g) of the method shown in FIG. 1 can be repeated as often as desired, in particular until all holes 22 of the second carrier 20' have been filled with inspected pipette tips 1, in which case any pipette tips remaining in the holding device are dispensed into a further carrier 20" having a plurality of holes 22 in a second matrix arrangement M2 of rows and columns, which holes 22 are suitable for holding the dispensed pipette tips 1.

FIG. 3*a* shows a longitudinal section through a holding device 10 for use in a method or device according to the first embodiment. The holding device 10 has fifteen pick-up elements 11, on each of which a pipette tip 1 is picked up. The pick-up elements 11 shown in this embodiment of the holding device 10 each have a conically shaped coupling element 18, which is connected in a fluid-conducting manner to a vacuum connection 19. The pipette tips 1 are held on the pick-up elements 11 of the holding device 10 by applying negative pressure to the respective pipette tip cavity. The holding device 10 further comprises means 13 for rotating the pipette tips 1 held in the holding device 10 on the pick-up elements 11 about their longitudinal axis L. The means 13 for rotating the held pipette tips 1 about their longitudinal axis L are each associated with a pick-up element 11 and, in the illustrated embodiment, comprise a gearwheel 14 on each pick-up element 11. In the illustrated embodiment, the gearwheels 14 mesh with one another and are rotatable by a common rotary drive.

By the means 13 shown, the pipette tips 1 can each be rotated from a first position to a second position by a rotation angle of at least 90°. Furthermore, means for aligning the pipette tips 1 held in the holding device 10 are attached to the holding device 10, which is part of a movement device 60—not visible in the depiction shown—for motorized movement of the holding device 10 in the direction of an X, Y and Z spatial axis. Such a movement device is, for example, an industrial robot, which is known per se to the person skilled in the art.

FIG. 3*b* shows a front view of the holding device 10 from FIG. 3*a*. From this view it is particularly evident that all pick-up elements 11 are arranged in a row. Each pipette tip 1 is held at its attachment end 4 on a pick-up element 11, which attachment end 4 is located in longitudinal direction L at the end opposite to its pipette tip outlet opening 2. The pipette tip jacket surface 3 represents the area between the attachment end 4 and the outlet opening 2 of a pipette tip 1. The longitudinal axes L of the pipette tips 1 held by the pick-up elements 11 lie substantially in a common plane E. The pipette tips 1 arranged in a row are rotated through a rotation angle by at least one drive 13. The individual pipette tips 1 are connected to one another by a mechanism, as described in more detail below in FIG. 4 using several conceivable examples.

FIG. 3*c* shows the holding device 10 shown in FIG. 3*a* in a detailed view and without pipette tips. From the view shown in FIG. 3*c* it is particularly evident that the longitudinal axes L, L' of two adjacent pick-up elements 11, 11' run parallel and that the pick-up elements 11, 11' are each non-rotatably connected to a crank 111, 111'. A gearwheel 14, 14' is in turn arranged on each of the cranks 111, 111', which gearwheels 14, 14' mesh with one another and are thus operatively connected to one another. The cranks 111, 111' are each supported by a plurality of bearings 112, 112' and sealed by means of a seal 113, 113'. The pick-up elements 11, 11' each have a conically shaped coupling element 18, 18', which is connected in a fluid-conducting manner to a vacuum connection 19, 19'.

FIG. 4 schematically shows further conceivable embodiments of the means 13 for rotating the pipette tips (not shown) held on the pick-up elements of a holding device about their longitudinal axis L, in each case from a view in the direction of the longitudinal axis L of the pipette tips 1. FIG. 4a shows five gearwheels 14, 14', which do not mesh with one another and can be moved by a common rack-and-pinion drive 17, i.e. can be rotated about their respective longitudinal axis L. The gearwheels 14, 14' are arranged on each pick-up element (not shown for reasons of clarity). Here, one gearwheel 14, 14' is arranged on each pick-up element (not shown for reasons of clarity). By moving the rack-and-pinion drive 17 in the direction of the arrow drawn above the rack-and-pinion drive 17 in FIG. 4a, all the gearwheels 14, 14'—and thus also all the pipette tips—can be rotated in the same direction as indicated by the arrows in the gearwheels 14, 14'. FIG. 4b shows an embodiment of the means 13 for rotating the pipette tips 1, in which a gearwheel 14 is arranged on each of the five pick-up elements. An intermediate gearwheel 141 is arranged between each two adjacent gearwheels 14, 14', which is in operative connection with the two gearwheels 14, 14'. The five gearwheels 14 shown and the four intermediate gearwheels 141 form a gear train 15. At least one of the gearwheels 14, 14' and/or at least one of the intermediate gearwheels 141 of the gear train 15 is rotatable by a rotary drive 16, for example by an electric drive, pneumatic cylinder or a solenoid. In this embodiment, all of the gearwheels 14, 14'—and thus all of the pipette tips—are rotatable in the same direction as indicated by the arrows in the gearwheels 14, 14'. FIG. 4c shows an embodiment in which one gearwheel 14 is arranged on each pick-up element (not shown). In each case, two adjacent gearwheels 14, 14' mesh to form a gear train 15. The gear train 15 is driven by a rotary drive 16 arranged at the right outer end of the gear train 15 in the illustration. This embodiment results in an alternating direction of rotation for the pipette tips, as shown by the arrows in FIG. 4c, but this is not important for the evaluation. In the variant shown in FIG. 4d, an individual drive 80, for example an electric drive, pneumatic cylinder or a lifting magnet, is assigned to each of the five pick-up elements 11. The pick-up elements 11 are not in operative connection with each other. As can be seen from the direction of the arrows shown, each pick-up element 11 can thus be rotated independently of the remaining pick-up elements 11 of the holding device (not shown). In the embodiment shown in FIG. 4e, each pick-up element (not shown) comprises a disk 91, which is arranged on the pick-up elements in a rotationally fixed manner in the circumferential direction U of the pick-up elements. A rod drive 90 is eccentrically attached to each of the disks 91 for converting a reciprocating movement of a drive rod 92 into a rotary movement of the disks 91 and thus of the pick-up elements and the pipette tips. In the variant of means 13 shown in FIG. 4f, a gearwheel 14 is arranged on each pick-up element. The gearwheels 14 do not mesh with each other and are rotatable by a common toothed belt 142. At the points where the toothed belt 142 is not deflected by the gearwheels 14 arranged at the outermost point in the illustration, support means 143 are also provided for ensuring the operative connection between the gearwheels 14 and the toothed belt 142. The six support means 143 shown prevent the toothed belt 142 from becoming detached from the gearwheels 14 and the drive of the pick-up elements from being interrupted.

Figure 5:
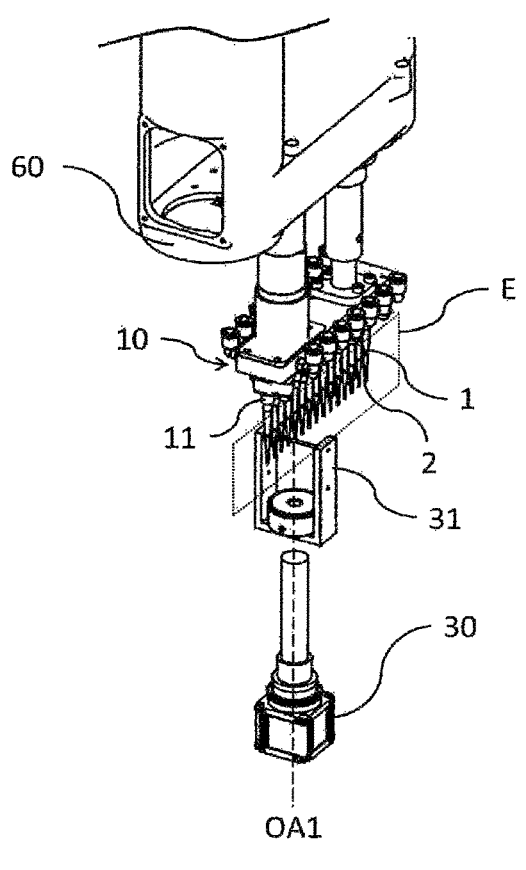

FIG. 5 shows an arrangement comprising a holding device 10 and a first image acquisition device 30 in a perspective view. The pipette tip outlet openings 2 of the pipette tips 1 held in the holding device 10 are moved past the first image acquisition device 30 with the aid of movement means 60 in such a way that the optical axis OA1 of the first image acquisition device 30 is aligned parallel to the respective longitudinal axis L of the pipette tips 1 held on the pick-up elements 11 and onto the respective pipette tip outlet opening 2 during the acquisition of the first image data. In the case of the arrangement shown in FIG. 5, which relates to the first embodiment of the device according to the invention, the movement of the holding device 10 by the movement device 60 takes place in the direction of the plane E spanned by the held pipette tips 1 and essentially perpendicularly to and through the optical axis OA1 of the first image acquisition device 30, wherein the pipette tips 1 guided through the optical axis OA1 of the first image acquisition device 30 in each case are moved past the first image acquisition device 30 essentially in one image plane, i.e. in each case at the same distance therefrom. In the case of using a holding device on which the pick-up elements 11 are arranged in a circular manner, the movement of the holding device 10 by the movement device 60 is accordingly carried out in such a way that the held pipette tips 1 are successively moved substantially perpendicularly to and through the optical axis OA1 of the first image acquisition device 30, wherein the pipette tips 1 respectively passed through the optical axis OA1 of the first image acquisition device 30 are each moved past the first image acquisition device 30 at substantially the same distance. In both embodiments, a measuring device 31 in the form of a light barrier may further be provided, which detects the entry of the respective pipette tip outlet openings 2 into the optical axis OA1 of the first image acquisition device 30. The measuring device 31 is connected to the first image acquisition device 30 in a signal-conducting manner (not shown) and triggers the acquisition of the first image data by the first image acquisition device 30 as soon as the light barrier is interrupted by a pipette tip 1.

FIG. 6 shows a perspective view of an arrangement comprising a holding device 10 and a second image acquisition device 40, as it is present during the acquisition of the second image data in step d) of the method according to the invention according to the first embodiment. The optical axis OA2 of the second image acquisition device 40 is thereby aligned substantially perpendicular to the plane E defined by the held pipette tips 1, said plane E lying substantially in an image plane of the second image acquisition device 40. The second image data of the respective partial segments of the pipette tip jacket surfaces 3 facing the second image acquisition device 40 are thus simultaneously acquirable. By rotating the pipette tips 1 held in the holding device 10 from a starting position through a rotation angle of 90° into an end position, in each case a further partial segment of the pipette tip jacket surface 3 can be detected, whereby the concentricity of the pipette tips can be checked from the image data obtained in the starting position and the end position (not shown).

FIG. 7 shows a variant of an apparatus 100 for inspecting pipette tips 1 according to the first embodiment, in a perspective view. The apparatus 100 comprises a receiving position 101, which is configured to provide a first rack 21 containing pipette tips in a first matrix arrangement M1, wherein the racks 21 are each arranged on a workpiece carrier 23 in the embodiment example shown. The workpiece carriers 23 are movable to the receiving position 101 by a transport device, for example a conveyor belt 103. The apparatus 100 further has a holding device 10 for picking up a complete row or complete column of pipette tips 1 from the first rack 20 provided at the receiving position 101. The holding device 10 comprises a plurality of pick-up elements 11 arranged in a row, each of which is configured to receive a pipette tip 1. Thus, for a first matrix arrangement M1 of the first rack of, for example, eight rows and twelve columns, the holding device has at least eight pick-up elements 11 arranged in a row to be able to pick up a complete column of eight pipette tips from one of the twelve columns of the first rack. However, according to the invention, it is conceivable that the holding device has twelve pick-up elements 11 arranged in a row so that either a complete column of eight pipette tips from one of the twelve columns of the first rack can be picked up or a complete row of twelve pipette tips from one of the eight rows of the first rack can be picked up. The apparatus 100 further comprises a first image acquisition device 30 for acquiring first image data of the respective pipette tip outlet openings 2, and a second image acquisition device 40 for acquiring second image data of the pipette tips 1 held in the holding device 10. Furthermore, a measuring device 31 for detecting the passage of the pipette tips through the optical axis of the first image acquisition device is provided. Apparatus 100 further comprises an illumination device 41 fixedly disposed relative to the second image acquisition device 40, the illumination device 41 being adapted to emit light onto the second image acquisition device 40 in the direction opposite to the optical axis of the second image acquisition device 40. A data processing system (not shown), in which allowable limits for the first and/or second image data are predefined, is thereby connected in a signal-conducting manner to at least the first image acquisition device 30, the second image acquisition device 40 and the holding device 10, so that pipette tips 1 whose first or second image data lie outside the allowable limits predefined in the data processing system can be ejected from their respective pick-up element 11 into a waste container (not shown). The apparatus 100 further comprises a dispensing position 102 where, in the shown embodiment, a second rack 21' is provided on another workpiece carrier 23. The second rack 21' has a plurality of holes in a second matrix arrangement M2 of rows and columns, each hole being configured to hold a pipette tip 1. In the embodiment shown, the first rack 21 and the second rack 21' are identically formed. The apparatus 100 further comprises means for aligning the pipette tips 1 held in the holding device 10 relative to the first image acquisition device 30 and the second image acquisition device 40, which in the shown embodiment example are realized by movement device 60, an industrial robot. The movement device 60 is configured to move the holding device 10 between the pick-up position 101, the first image acquisition device 30, the second image acquisition device 40, the waste container not shown in FIG. 7 and the dispensing position 102.

FIG. 8 shows a carrier 20 for providing pipette tips 1 in a plurality of circular arrays K in a schematic representation. The arrangement of the pipette tips 1 in the carrier 20 preferably corresponds to the arrangement of the pipette tips 1 in the cavities of the injection mold from which they originate, which is not shown in FIG. 8, so that the pipette tips produced can simply be transferred to the first carrier 20 after opening the injection mold while retaining the arrangement present in the injection mold, i.e. the mold arrangement. In the case of the example shown in FIG. 8, the first carrier 20 comprises eight circular arrays K, each with eight receptacles for a pipette tip 1. In principle, injection molds with eight or a multiple of eight cavities (e.g. 16, 32, 64, 96 or 128) are preferably used in the production of pipette tips, although numbers of cavities deviating therefrom (e.g. 12, 20, etc.) are also feasible. Consequently, as explained above, the number of cavities as well as their arrangement in the carrier may also vary, in particular depending on the injection mold used.

FIG. 9a shows a side view of a holding device 10 with eight circularly arranged pick-up elements 11 for receiving one pipette tip 1 each according to the second embodiment of the device according to the invention, as can be seen from the bottom view shown in FIG. 9c. The arrangement of eight pipette tips 1 evenly spaced from one another in the circumferential direction of the circular array K shown in FIG. 9c corresponds to the circular array K as it is present in the first carrier 20 shown in FIG. 8. A longitudinal section through the holding device 10 along the line B-B is shown in FIG. 9b. As can be seen therefrom, the pick-up elements 11 each have a conically shaped coupling element 18, which is connected in a fluid-conducting manner to an associated vacuum connection 19. The holding device 10 further has an axis of rotation A extending in the direction of the pipette tips 1 picked up by the holding device 10. The axis of rotation A of the holding device 10 thus runs essentially parallel to the longitudinal axes L of the pipette tips 1 held by the pick-up elements 11 of the holding device 10.

FIG. 10a shows a further embodiment of a holding device 10 with a plurality of circularly arranged pick-up elements 11 for receiving pipette tips 1 in a side view. As can be seen from the longitudinal section through the holding device 10 along the line C-C in FIG. 10a, the pick-up elements 11 can each be equipped with a lifting function, whereby the pipette tips 1 can be dispensed and/or picked up in a controlled manner along their longitudinal axes L. In this way, for example, the risk of a collision of pipette tips 1 in the holding device 10 can be reduced. In this way, for example, the risk of a collision of pipette tips held by the holding device 10 and already present in the second carrier can be eliminated.

FIG. 11a shows a perspective view of an arrangement comprising a holding device 10 and a second image acquisition device 40 according to the second embodiment of the device according to the invention. During the acquisition of the second image data of the eight pipette tips 1 held in the holding device 10, the optical axis OA2 of the second image acquisition device 40 is aligned transversely to the longitudinal axis L and onto the partial segments of the respective pipette tip jacket surfaces 3 of these eight pipette tips 1 facing it. The holding device 10 is positioned in the beam path between the illumination device 41 and the second image acquisition device 40.

FIG. 11b shows the holding device 10 of FIG. 11a from the view of the second image acquisition device in FIG. 11a in the direction of the illumination device 41. As can be seen from the representation of the pipette tips 1 in the left half of FIG. 11b, which corresponds to the situation in FIG. 11a, of the total of eight pipette tips 1 which are held in the holding device 10, the contours of only five pipette tips 1 can be detected by the second image acquisition device, since three pipette tips are covered by three of the detectable pipette tips 1. In order that the second image data of all of the pipette tips 1 held in the holding device 10 can be acquired by the second image acquisition device, the holding device 10 can be rotated about its rotation axis A by a rotation angle ß in such a manner before acquiring the second image data. The result of the rotation of the holding device 10 by a rotation angle β of about 15° is shown in the right half of FIG. 11*b* and shows that, as a result of this rotation, the contours of all pipette tips 1 held in the holding device 10 can now be detected by the second image acquisition device. In the right half of FIG. 11*b*, there is a gap between the pipette tips 1 shown adjacent to one another in the beam path in the area of the respective pick-up elements on the left and right with respect to the respective longitudinal axis of the pipette tips, which is no longer visible to the naked eye in this illustration, but which can be reliably detected by the second image acquisition device.

FIG. 12*a* shows a perspective view of an arrangement comprising a holding device 10, a second image acquisition device 40 and a third image acquisition device 43. The optical axes OA2 and OA3 of the second and third image acquisition devices 40, 43, respectively, are aligned substantially perpendicular to each other and onto the partial segments of the respective pipette tip jacket surfaces facing the respective image acquisition devices 40, 43. The pipette tips 1 held by the holding device 10 are thereby positioned between the second image acquisition device 40 and an illumination device 41, and also between the third image acquisition device 43 and a further illumination device 41'. A schematic representation of the beam path through the pipette tips 1 held in the holding device 10 from FIG. 12*a* is shown in FIG. 12*b*. As can be seen in FIG. 12*b*, the contours of the first part of the pipette tips held in the holding device 10, i.e. the contours of the pipette tips marked with the reference sign 1*a*, can be completely detected by the second image acquisition device, since the pipette tips marked with the reference sign 1*a* are individually resolved in the beam path of the optical axis OA2 of the second image acquisition device. The contours of the second part of the pipette tips held in the holding device 10, i.e. the contours of the pipette tips provided with the reference sign 1*b*, are completely detectable by the third image detection device, since the pipette tips provided with the reference sign 1*b* are present individually resolved in the beam path of the optical axis OA3 of the third image detection device. Analogously to the embodiment described in FIGS. 11*a* and 11*b*, also in the presence of a third image acquisition device, depending on the arrangement, size and spacing of the held pipette tips, it may be advantageous to rotate the holding device 10 about its rotation axis by a rotation angle β before acquiring the second image data, in order to be able to detect the contours of the pipette tips 1*a*, 1*b* held in the holding device 10, preferably completely, by the second and third image acquisition devices 40, 43.

FIG. 13*a* shows a side view of an arrangement of a holding device 10 with an illumination device 44 attached thereto and a second image acquisition device 40. The illumination device 44 has two plane-parallel light emission surfaces 44*a*, 44*b* and divides the circular array of pipette tips 1 into two halves, K1 and K2. During the acquisition of the second image data, the optical axis OA2 of the second image acquisition device 40 is aligned perpendicularly to the illumination device 44, namely to the light emitting surface 44*a* facing the second image acquisition device 40. Further, the optical axis OA2 of the second image acquisition device is also aligned with the partial segments of the respective pipette tip jacket surfaces 3 facing the second image acquisition device 40 during the acquisition of the second image data. FIG. 13*b* shows a perspective view of the arrangement of FIG. 13*a*, wherein the light emitting surface 44*b* facing away from the second image acquisition device 40 as well as the half K2 of the circular array of pipette tips 1 facing away from the second image acquisition device 40 are shown. When using a single second image acquisition device 40, as in the embodiment example according to FIGS. 13*a* and 13*b*, first the second image data of those pipette tips 1 belonging to the half K1 facing the second image acquisition device 40 is acquired. Subsequently, the holding device 10 is rotated by 180° in order to turn the other half K2 of pipette tips 1, which is separated from the first half K1 by the illumination device 44, towards the second image acquisition device 40. Alternatively, when using another image acquisition device for acquiring the second image data 42 (not shown), it is possible to acquire the second image data of the pipette tips 1 of both halves K1 and K2 simultaneously. For this purpose, the two image acquisition devices for acquiring second image data 40, 42 are aligned in opposite directions with respect to the holding device 10 positioned between the two image acquisition devices 40, 42.

The invention claimed is:

1. A method of inspecting pipette tips each extending along a longitudinal axis (L), the method comprising the following method steps:
   a) providing pipette tips arranged in a first carrier;
   b) picking up pipette tips from the first carrier with a holding device comprising a plurality of pick-up elements for receiving one pipette tip each;
   c) acquiring first image data of the respective pipette tip outlet openings of the pipette tips picked up by the holding device by a first image acquisition device;
   d) acquiring second image data of the pipette tips held in the holding device by a second image acquisition device, the optical axis (OA2) of which is aligned during the acquisition of the second image data transversely to a respective longitudinal axis (L) of the pipette tips held in the holding device and onto partial segments of the respective pipette tip jacket surfaces of the held pipette tips facing the second image acquisition device;
   e) determining whether or not at least one of the first and the second image data are within predefined allowable limits using a data processing system;
   f) discarding those pipette tips whose at least one of first and second image data determined in step e) lie outside the predefined allowable limits into a waste container by the holding device; and
   g) dispensing those pipette tips whose first and second image data determined in step e) lie within the predefined allowable limits into a second carrier;
wherein in method step d) the second image data of a plurality of the pipette tips held in the holding device are acquired simultaneously.

2. The method according to claim 1, wherein:
   the pipette tips provided in step a) are arranged in the first carrier in a first matrix arrangement of rows and columns;
   in step b) a row or column of pipette tips from the first matrix arrangement is picked up by the holding device, wherein the pick-up elements of the holding device are arranged in a row, and wherein the longitudinal axes (L) of the pipette tips held by the pick-up elements lie substantially in a common plane (E);
   in step c) the optical axis (OA1) of the first image acquisition device is aligned in the same direction to the respective longitudinal axis (L) of the pipette tips held in the holding device and onto the respective pipette tip outlet opening during the acquisition of the first image data;
   in step d) the optical axis (OA2) of the second image acquisition device is aligned substantially perpendicular to the plane (E) defined by the held pipette tips during the acquisition of the second image data, so that all pipette tips held in the holding device are arranged substantially in one image plane of the second image acquisition device, wherein the second image data of all pipette tips held in the holding device are acquired simultaneously;

in step g), the second carrier has a plurality of holes in a second matrix arrangement of rows and columns, the holes being suitable for holding the dispensed pipette tips; and wherein the pipette tips are dispensed in method step g) by the holding device in such a way that the respective rows or columns of holes of the second carrier are filled up one after the other without leaving one or more empty holes between two dispensed pipette tips.

3. The method according to claim 1, wherein:

the pipette tips provided in step a) are arranged in the first carrier in at least one circular array;

in step b) a circular array of pipette tips is picked up from the first carrier by the holding device.

4. The method according to claim 3, wherein in step d) the holding device is rotated about its axis of rotation (A) running in the direction of the pipette tips picked up by the holding device during the acquisition of the second image data.

5. The method according to claim 4, wherein during the acquisition of the second image data in step d), the optical axis (OA2) of the second image acquisition device is further aligned with an illumination device attached to the holding device and located at the center of the circular array of pipette tips, which illumination device emits light toward the second image acquisition device during the acquisition of the second image data in step d).

6. The method according to claim 3, wherein the second image data of the pipette tips held in the holding device are additionally acquired in step d) by a third image acquisition device, the optical axis (OA3) of which is aligned during the acquisition of the second image data substantially perpendicular to the optical axis (OA2) of the second image acquisition device and onto the partial segments, facing the third image acquisition device, of the respective pipette tip jacket surfaces of the picked-up pipette tips.

7. The method according to claim 3, wherein the optical axis (OA2) of the second image acquisition device during the acquisition of the second image data in step d) is further aligned perpendicular to an illumination device attached to the holding device and dividing the circular array of pipette tips into two halves, said illumination device having two substantially plane-parallel light emitting surfaces for emitting light in the direction of said second image acquisition device and opposite to said direction, wherein, in step d)

i. the second image data of one half of the pipette tips are acquired and the holding device is rotated by 180° about its axis of rotation (A) extending in the direction of the pipette tips picked up by the holding device before the second image data of the other half of the pipette tips are acquired; or ii. a further image acquisition device for acquiring second image data of the pipette tips held in the holding device is provided, the optical axis of which is aligned opposite to the optical axis (OA2) of the second image acquisition device, wherein the second image data of both halves of the circular array of pipette tips are acquired simultaneously.

8. The method according to claim 1, wherein the first image data in step c) is acquired when moving the pipette tips held in the holding device transversely to the optical axis (OA1) of the first image acquisition device and through the optical axis (OA1) of the first image acquisition device relative to each other, wherein the entry of the respective pipette tips into the optical axis (OA1) of the first image acquisition device is detected by a measuring device and triggers the acquisition of the first image data by the first image acquisition device, wherein only the holding device is moved and the first image acquisition device remains stationary.

9. The method according to claim 1, wherein step d) comprises the following method steps:

i. acquiring a first image of the pipette tips held in the holding device, wherein the pipette tips are each in a first position;

ii. rotating the pipette tips held in the holding device about their longitudinal axis (L) by a predetermined angle of rotation (a) to a second position;

iii. acquiring a second image of the pipette tips held in the holding device, the pipette tips each being in the second position;

wherein the angle of rotation (a) between the first position and the second position is at least 90°.

10. The method according to claim 9, wherein the pipette tips for acquiring further images are rotated into a number of intermediate positions corresponding to the number of further images, which intermediate positions are located between the first position and the second position.

11. The method according to claim 1, wherein the data processing system comprises a user interface, and the method additionally comprises a method step:

h) selecting at least one pick-up element of the holding device by a user, wherein the pipette tips held on the selected pick-up elements are discarded as rejects as a result of the selection independently of the acquired first and second image data in step f);

wherein step h) is performed prior to any of steps a) through f).

12. An apparatus for inspecting pipette tips each extending along a longitudinal axis (L), the apparatus comprising:

a receiving position configured to provide a first carrier containing pipette tips;

a holding device for picking up pipette tips from the first carrier provided at the receiving position, the holding device comprising a plurality of pick-up elements, which pick-up elements are configured for receiving one pipette tip each;

a first image acquisition device for acquiring first image data of the respective pipette tip outlet openings of the pipette tips picked up by the holding device;

a second image acquisition device for acquiring second image data of the pipette tips held in the holding device;

a data processing system which is signal-conductively connected to the first image acquisition device, the second image acquisition device and the holding device, and in which allowable limits for at least one of the first and the second image data are predefined;

a waste container configured to receive pipette tips discarded by the holding device;

a dispensing position on which a second carrier can be provided;

the apparatus comprising means for aligning the optical axis (OA1) of the first image acquisition device parallel to the respective longitudinal axis (L) of the pipette tips held in the holding device and onto the respective pipette tip outlet openings, and for aligning the optical axis (OA2) of the second image acquisition device transverse to the respective longitudinal axis (L) of the pipette tips held in the holding device and onto the partial segments of the respective pipette tip jacket surfaces of the held pipette tips facing the second image acquisition device, said holding device being movable back and forth between at least two of said receiving position, said first image acquisition device, said second image acquisition device, said waste container and said dispensing position.

13. The apparatus according to claim 12, wherein the pipette tips are arranged in the first carrier in a first matrix arrangement of rows and columns;

the holding device is configured to pick up a row or column of pipette tips from the first matrix arrangement of rows and columns, and the pick-up elements of the holding device are arranged in a row, the longitudinal axes (L) of the pipette tips held by the pick-up elements lying substantially in a common plane (E);

the second carrier has a plurality of holes in a second matrix arrangement of rows and columns, which holes are suitable for holding the pipette tips;

the means for aligning the optical axis (OA2) of the second image acquisition device are configured to align the optical axis (OA2) of the second image acquisition device substantially perpendicular to the plane (E) defined by the held pipette tips; and wherein the holding device is adapted for successively filling the respective rows or columns of holes of the second carrier with pipette tips without leaving one or more empty holes between two dispensed pipette tips.

14. The apparatus according to claim 13 or, wherein the pick-up elements of the holding device are configured to be movable with respect to each other so that their position with respect to each other can be adapted to at least one of the first matrix arrangement and the second matrix arrangement of pipette tips.

15. The apparatus according to claim 12, wherein the pipette tips are arranged in a circular array in the first carrier, and wherein the arrangement of the pick-up elements of the holding device corresponds to the circular array of the pipette tips in the first carrier.

16. The apparatus according to claim 15, wherein the holding device comprises means for rotating the holding device about its axis of rotation (A) extending in the direction of the pipette tips picked up by the holding device.

17. The apparatus according to claim 15, wherein said holding device comprises:

an illumination device fixed to the holding device and dividing the circular array of pipette tips into two halves, the illumination device having two plane-parallel light emitting surfaces for emitting light in opposite directions; or an illumination device fixed to the holding device and arranged in the center of the circular array of pipette tips, for emitting light in the direction of the second image acquisition device, the illumination device being designed in particular in the form of a cylinder with a circumferential light emission surface.

18. The apparatus according to claim 12, wherein the holding device comprises means for rotating the pipette tips held in the holding device about their longitudinal axis (L), which means are configured to rotate the pipette tips from a first position to a second position through a rotation angle ($\alpha$) of at least 90°.

19. The apparatus according to claim 18, wherein the means for rotating the pipette tips held in the holding device comprise at least one of:

a gearwheel on each pick-up element, which gearwheels mesh to form a gear train and are rotatable by a rotary drive; and a gearwheel on each pick-up element, two adjacent gearwheels being operatively connected to one another via an intermediate gearwheel to form a gear train, at least one of at least one of the gearwheels and at least one of the intermediate gearwheels of the gear train being rotatable by a rotary drive; and a gearwheel on each pick-up element, which gearwheels do not mesh and are rotatable by a common rack-and-pinion drive; and a gearwheel on each pick-up element, which gearwheels do not mesh and are rotatable by a common toothed belt; and an individual drive on each pick-up element, wherein each pick-up element is rotatable by the individual drive independently of the remaining pick-up elements of the holding device; and a disc on each pick-up element, which discs are each arranged on the pick-up elements in a rotationally fixed manner in the circumferential direction (U) of the pick-up elements and on which discs a rod drive for converting a reciprocating movement of a drive rod into a rotational movement of the pick-up elements is eccentrically applied in each case.

20. An injection molding machine comprising at least one apparatus for inspecting pipette tips according to claim 12.

* * * * *